US012476582B2

(12) United States Patent
Demasie et al.

(10) Patent No.: US 12,476,582 B2
(45) Date of Patent: Nov. 18, 2025

(54) STRUCTURE FOR STOWING AND DEPLOYING SOLAR PANELS

(71) Applicant: EWX FIELD SERVICES, LLC, Houston, TX (US)

(72) Inventors: Michael Demasie, Houston, TX (US); Martin Janda, Houston, TX (US); Luke Sonnefeld, Houston, TX (US)

(73) Assignee: EWX FIELD SERVICES, LLC, Houston, TX (US)

( * ) Notice: Subject to any disclaimer, the term of this patent is extended or adjusted under 35 U.S.C. 154(b) by 247 days.

(21) Appl. No.: 18/144,735

(22) Filed: May 8, 2023

(65) Prior Publication Data

US 2023/0275543 A1 Aug. 31, 2023

Related U.S. Application Data

(63) Continuation-in-part of application No. 17/495,659, filed on Oct. 6, 2021, now Pat. No. 11,680,691.

(60) Provisional application No. 63/088,796, filed on Oct. 7, 2020.

(51) Int. Cl.
*H02S 30/20* (2014.01)
*B65D 88/12* (2006.01)
*B65D 90/02* (2019.01)
*H02S 20/30* (2014.01)

(52) U.S. Cl.
CPC ............ *H02S 30/20* (2014.12); *B65D 88/121* (2013.01); *B65D 90/02* (2013.01); *H02S 20/30* (2014.12)

(58) Field of Classification Search
CPC ....... B65D 88/121; B65D 90/02; H02S 30/20; H02S 20/30
See application file for complete search history.

(56) References Cited

U.S. PATENT DOCUMENTS

| | | | |
|---|---|---|---|
| 11,641,176 B2* | 5/2023 | Lalane | H02S 20/10 52/173.3 |
| 2012/0023728 A1* | 2/2012 | Britcher | B61B 5/02 254/2 R |
| 2013/0285595 A1* | 10/2013 | Eaton, Jr. | H10F 19/00 320/101 |
| 2015/0090315 A1* | 4/2015 | Spisak | H02S 30/20 136/245 |
| 2017/0302223 A1* | 10/2017 | Boyk | H02S 20/30 |
| 2019/0044011 A1* | 2/2019 | Pereira | H10F 19/10 |

(Continued)

FOREIGN PATENT DOCUMENTS

EP 2378565 A1 * 10/2011 ............ F24S 20/50

*Primary Examiner* — Theodore V Adamos
(74) *Attorney, Agent, or Firm* — Jeffrey L. Streets

(57) ABSTRACT

An apparatus is provided for supporting solar panels in a stowed position and a deployed position. The apparatus comprises opposing end panels that each include a stationary track and first and second rigid frames configured to secure solar panels. One rigid frame is secured between the end panels and the other rigid frame is secured between first and second trolleys. The trolleys are moveable along the stationary tracks to deployable tracks supported by a pair of laterally extending arms. The pair of arms are selectively positionable in deployed positions in which the deployable tracks extend in a first lateral direction in alignment with the stationary tracks. Positioning the pair of arms in the deployed position enables the trolleys to be moved along the stationary tracks to the deployable tracks.

17 Claims, 21 Drawing Sheets

(56) References Cited

U.S. PATENT DOCUMENTS

| | | | |
|---|---|---|---|
| 2023/0249625 A1* | 8/2023 | Van Straten | B60R 9/055 224/314 |
| 2023/0283229 A1* | 9/2023 | Sponsler | H02S 20/30 136/245 |

* cited by examiner

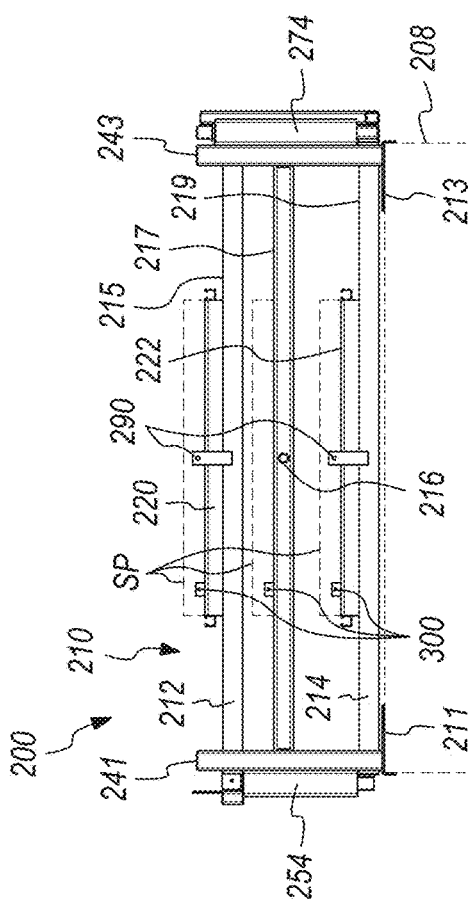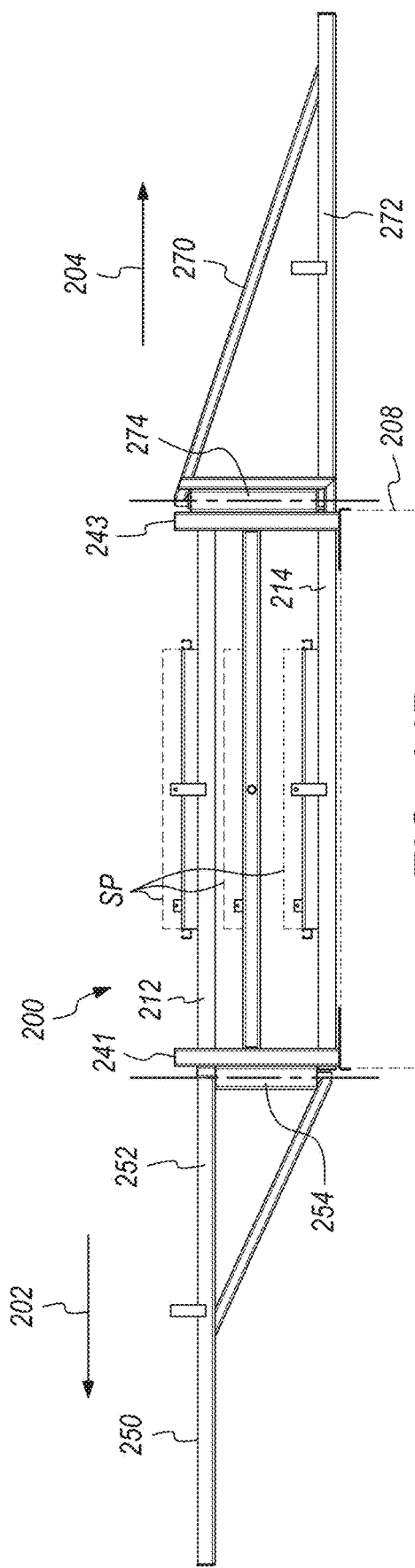

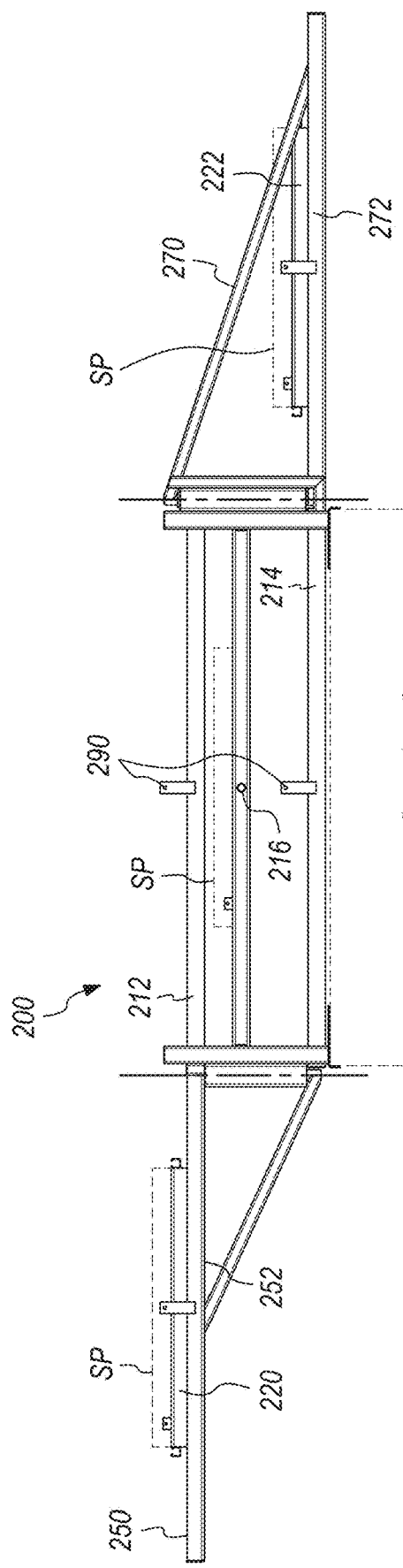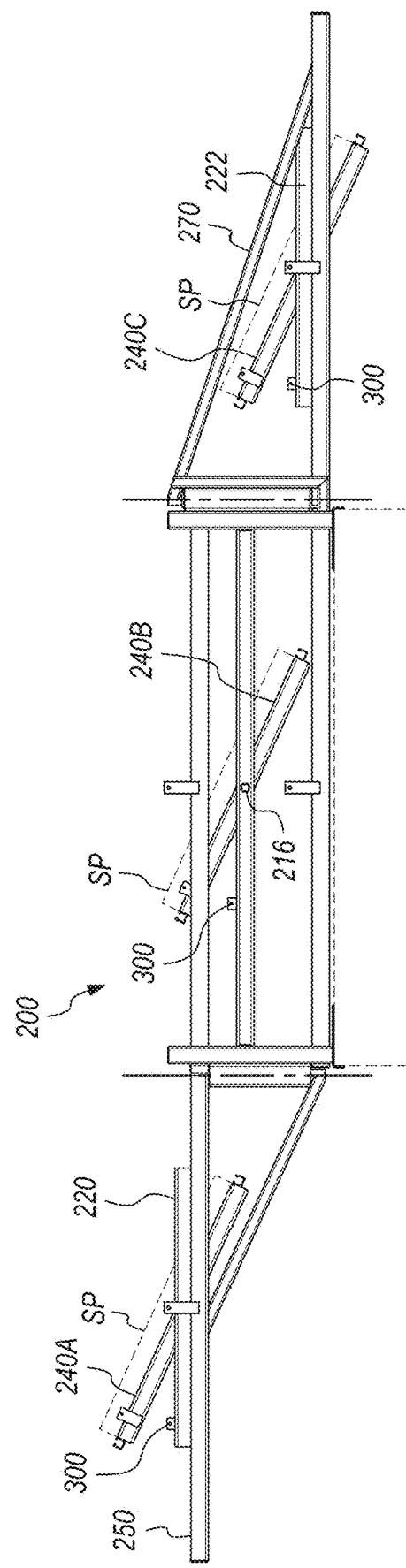

STRUCTURE FOR STOWING AND DEPLOYING SOLAR PANELS

CROSS-REFERENCE TO RELATED APPLICATIONS

This application is a continuation-in-part of U.S. Non-Provisional patent application Ser. No. 17/495,659 filed on Oct. 6, 2021, which claims the benefit of U.S. Provisional Patent Application No. 63/088,796 filed on Oct. 7, 2020, which applications are incorporated by reference herein.

BACKGROUND

The present disclosure relates to a structure that is configured to secure solar panels and adjust their position for transportation and use.

BACKGROUND OF THE RELATED ART

A photovoltaic (PV) system is an electrical power system that includes solar panels designed to convert sunlight directly into usable emission-free electrical power. Photovoltaic systems may also include an inverter to convert direct current output from the solar panels to alternating current that is suitable for powering the electrical appliances and devices used in residences and businesses. An electrical power system that is not connected to an electrical grid may be referred to as "off-grid" and does not require components for interfacing with the electrical grid. Photovoltaic systems may further include an energy storage device, such as a rechargeable battery, to store surplus energy for subsequent use. Often, the energy stored in the storage device is used at a time when there is insufficient sunlight for the solar panels to supply the momentary demand for electricity. Accordingly, a photovoltaic system may be an important part of a plan to reduce the carbon footprint of a given project, facility or company.

For various applications, it is desirable to transport solar panels to a particular location or work site to provide a source of electrical power that supports activity at the location or work site. However, the duration of the activity at the location or work site may be limited, such that a permanent installation of solar panels is not practical. Therefore, it may be desirable to have a system or apparatus that allows solar panels to be transported to a desired location and easily deployed.

BRIEF SUMMARY

Some embodiments provide an apparatus for supporting solar panels. The apparatus comprises first and second opposing end panels, the first end panel forming a first stationary track and the second end panel forming a second stationary track. The apparatus further comprises first and second rigid frames, each rigid frame being configured to secure a solar panel, wherein the second rigid frame has a first end secured to the first end panel and a second end secured to the second end panel. Still further, the apparatus comprises first and second trolleys, wherein the first trolley is supported by the first stationary track and moveable along the first stationary track, wherein the second trolley is supported by the second stationary track and moveable along the second stationary track, and wherein the first rigid frame has a first end secured to the first trolley and a second end secured to the second trolley. The apparatus also comprises first and second arms, wherein the first arm forms a first deployable track and the second arm forms a second deployable track. The first arm is selectively positionable in a first deployed position in which the first deployable track extends in a first lateral direction in alignment with the first stationary track and the second arm is selectively positionable in a second deployed position in which the second deployable track extends in the first lateral direction in alignment with the second stationary track. Positioning the first arm in the first deployed position and the second arm in the second deployed position enables the first trolley to be moved along the first stationary track to the first deployable track and the second trolley to be moved along the second stationary track to the second deployable track.

BRIEF DESCRIPTION OF THE SEVERAL VIEWS OF THE DRAWINGS

FIGS. 14A-D are a series of end views of the apparatus illustrating stepwise changes to the configuration of the apparatus from a stowed position to a deployed position.

DETAILED DESCRIPTION

Figure 1:
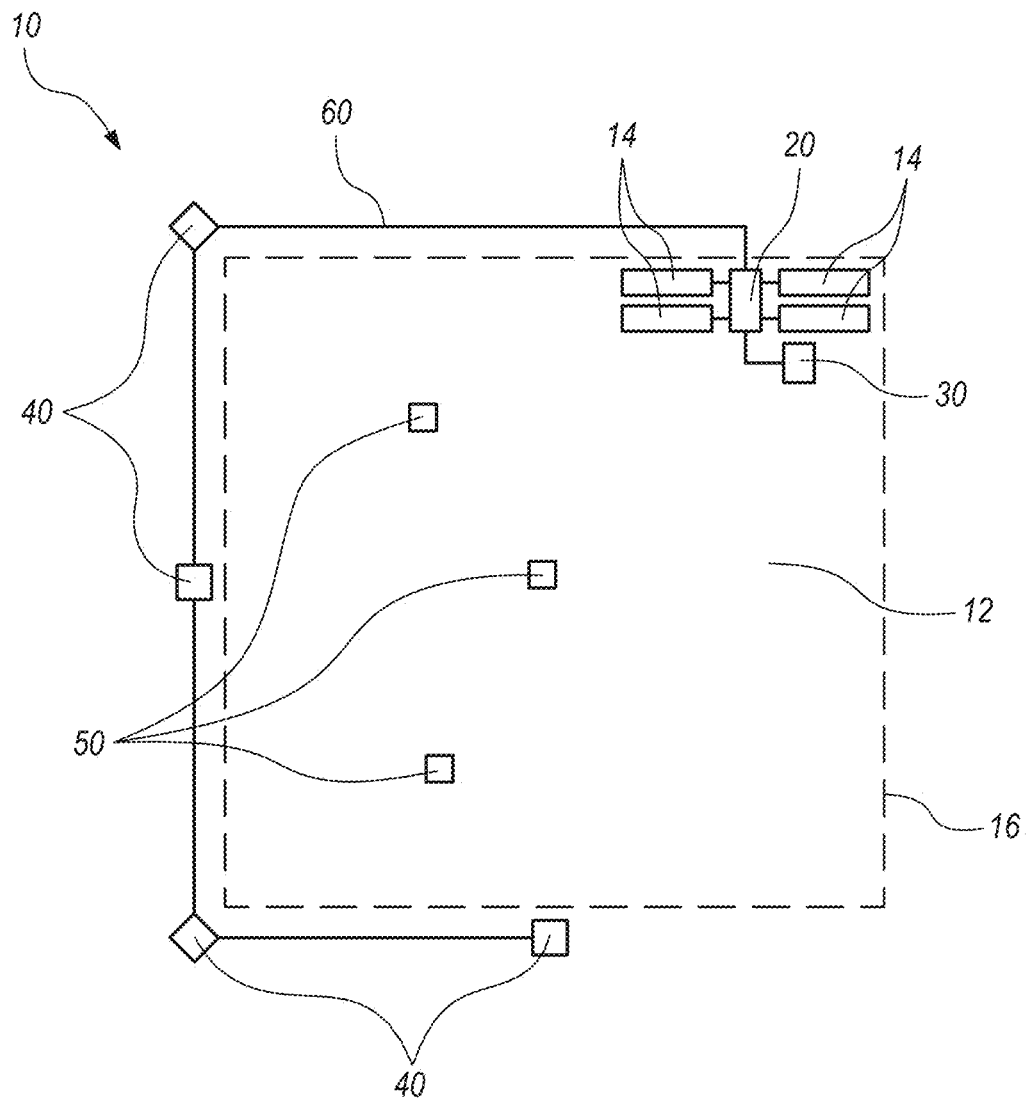
FIG. 1 is a plan view of a hybrid off-grid power and lighting system set up at a worksite.

Some embodiments provide a system include a control unit, a solar unit and a light unit. The control unit may include a main distribution box having a plurality of alternating current connections, a combustion engine electrical generator having an alternating current output coupled to one of the alternating current connection of the main distribution box, and a first plurality of photovoltaic panels having a direct current output coupled to a first solar inverter that converts the direct current output to an alternating current output that is coupled to one of the alternating current inputs of the main distribution box. The solar unit may include a second plurality of photovoltaic panels having a direct current output coupled to a second solar inverter that converts the direct current output to an alternating current output that is detachably coupled to one of the alternating current inputs of the main distribution box using a cable, and a first rechargeable battery unit coupled to a first battery inverter. The first battery inverter may be controlled to convert alternating current to direct current for charging the first battery unit and to convert direct current discharged from the first rechargeable battery to alternating current, and the first battery inverter may be detachably coupled to one of the alternating current inputs of the main distribution box using a cable. The light unit includes an array of area lights supported by a mast, a third plurality of photovoltaic panels having a direct current output coupled to a third solar inverter that converts the direct current output to an alternating current output, and a second rechargeable battery unit coupled to a second battery inverter. The second battery inverter may be controlled to convert alternating current to direct current for charging the second rechargeable battery unit and to convert direct current discharged from the second rechargeable battery to alternating current, and the first battery inverter is coupled to the third solar inverter and the array of area lights and is detachably coupled to one of the alternating current connections of the main distribution box using a cable.

In some embodiments, the control unit may further include a first shipping container that secures the combustion engine electrical generator, the first plurality of photovoltaic panels, the first solar inverter, and the AC main distribution box during transportation and use. Similarly, the solar unit may further include a second shipping container that secures the second plurality of photovoltaic panels, the second solar inverter, the first battery inverter, and the first energy storage device. Still further, the light unit may further include a third shipping container that secures the third plurality of photovoltaic panels, the third solar inverter, the second battery inverter, and the second energy storage device.

In some embodiments, the first shipping container may include a first suspended cable tray that is slidably deployable from an end of the first shipping container and is extendable toward one of the third shipping containers. The third shipping container may similarly include a second suspended cable tray that is slidably deployable from an end of the third shipping container and is extendable toward the first shipping container. The first and second cable trays may form a continuous support for an umbilical cable having a first end connected to the control unit and a second end connected to the light unit of the third shipping container.

In some embodiments, the first plurality of photovoltaic panels are hingedly coupled to the first shipping container, the second plurality of photovoltaic panels are hingedly coupled to the second shipping container, and the third plurality of photovoltaic panels are hingedly coupled to the third shipping container. For example, the photovoltaic panels may form a side panel of the shipping container and hinge along an upper end of the side panel. The first shipping container may include a first actuator for moving the first plurality of photovoltaic panels from a stowed position to a deployed position, the second shipping container may include a second actuator for moving the second plurality of photovoltaic panels from a stowed position to a deployed position, and the third shipping container may include a third actuator for moving the third plurality of photovoltaic panels from a stowed position to a deployed position. Alternatively, the panels may be manually moved and supported in the deployed position with an elongated rigid brace.

In some embodiments, a first set of hydraulic outriggers may be coupled to the first shipping container for raising the first shipping container a distance above a first delivery trailer and lowering the first shipping container to rest on a first support structure, such as the ground of a rock or concrete pad. Similarly, a second set of hydraulic outriggers may be coupled to the second shipping container for raising the second shipping container a distance above a second delivery trailer and lowering the second shipping container to rest on a second support structure, and a third set of hydraulic outriggers may be coupled to the third shipping container for raising the third shipping container a distance above a third delivery trailer and lowering the third shipping container to rest on a third support structure. A set of outriggers for one of the shipping containers may include four outriggers, such that the shipping container may be raised evenly above the delivery trailer in a stable manner. In one option, the first set of hydraulic outriggers may be further adapted to stabilize the first shipping container in an upright position with the first shipping container supported by the first support structure. Accordingly, the set of outriggers may continue to serve a useful purpose when not being used to raise and lower the shipping container. Similarly, the second set of hydraulic outriggers may be further adapted to stabilize the second shipping container in an upright position with the second shipping container supported by the second support structure, and the third set of hydraulic outriggers may be further adapted to stabilize the third shipping container in an upright position with the third shipping container supported by the third support structure.

In some embodiments, the light unit includes a telescoping cylinder that is secured to the third shipping container and upwardly extendable to form an upright mast, wherein the upright mast has a distal end supporting the array of area lights. In one option, the telescoping cylinder may be hingedly secured to the third shipping container and pivotable between a horizontal stowed position within the third shipping container and an upright deployable position extending above the third shipping container. In another option, a wind generator may be supported by the distal end of the upright mast.

In some embodiments, the first shipping container may have a floor including or supporting a track mechanism for securing any one of a plurality of electrical generators having different physical connector patterns and/or dimensions. The track mechanism may include a pair of tracks and a pair of rails including at least one rail that is slidable along the pair of tracks. Each rail includes bolts holes spaced apart to match one dimension, such as a width, of a connector pattern for a first electrical generator as well as a connector pattern for a second electrical generator. Furthermore, at least one rail is slidable along the pair of tracks to a distance from the other rail to match another dimension, such as length, of the connector pattern for the first electrical generator as well as the connector pattern for the second electrical generator. Accordingly, the track mechanism may be quickly adapted between different physical connector patterns and/or dimensions for supporting and securing either the first or second electrical generators.

In some embodiments, the system may further include a first umbilical cable for connecting the solar unit to the control unit, wherein the first umbilical cable supports AC voltage transmission from the second solar inverter to the AC main distribution box, AC voltage transmission between the first battery inverter and the AC main distribution box, and communication signal transmission from a controller in the control unit to the second solar inverter and the first battery inverter in the solar unit. In one option, the first umbilical cable may have a first end with a first quick connect coupling for connecting to a first mating coupling on the control unit and may have a second end with a second quick connect coupling for connecting to a second mating coupling on the solar unit.

In some embodiments of the system, the light unit is one of a plurality of light units. Accordingly, the system may further include a plurality of umbilical cables, each umbilical cable adapted for connecting a particular one of the plurality of light units to the control unit. Each umbilical cable supports AC voltage transmission from the third solar inverter of the particular light unit to the AC main distribution box, AC voltage transmission between the third battery inverter of the particular light unit to the AC main distribution box, and communication signal transmission from a controller in the control unit to the third solar inverter and the third battery inverter in the particular light unit. In one option, the control unit may include a facility power output from the AC main distribution box for supplying electricity to an external power consuming unit.

In some embodiments, the system may further include an automatic transfer switch in communication with the combustion engine electrical generator for turning on the combustion engine electrical generator in response to sensing that an electrical demand on outputs from the AC main distribution exceeds the electrical supply available from the first, second and third pluralities of photovoltaic panels and the first and second energy storage devices.

Embodiments of the system may further include a controller. For example, the controller may be in digital communication with the first, second and third solar inverters and the first and second battery inverters. Furthermore, the controller may be in digital communication with a first power meter that measures an amount of power input to the AC main distribution board from the combustion engine electrical generator and a second power meter that measure an amount of power output from the AC main distribution board to an external power consuming unit. The controller may execute logic that controls when the batteries are charging or discharging, and when to run the combustion engine electrical generator. Furthermore, the controller may utilize a model of predicted power consumption and power generation to optimize the use of photovoltaic power or other renewable energy source. In some embodiments, the controller may execute control logic to control the first, second and third solar inverters, the first and second battery inverters, and the combustion engine electrical generator to maximize use of power from the photovoltaic panels. Still further, the controller may receive operating data from any component of the system, such as the first, second and third solar inverters, the first and second battery inverters, and the combustion engine electrical generator.

In some embodiments, a network gateway may convert digital communication in a first network using a first serial communication protocol and a second network using a second serial communication protocol, wherein the first network includes the first, second and third solar inverters and the first and second battery inverters, and wherein the second network includes the controller. In one option, the first serial communication protocol may be the RS485 standard and the second serial communication protocol may be the Ethernet standard.

In some embodiments, a modem may be in communication with the controller, such that the modem enables the controller to communicate with a remote computer over a wide area network. Optionally, the controller may provide a software interface for enabling the remote computer to monitor power production and consumption within the system. Furthermore, some processing may be performed by a remote application server to reduce the load on the controller.

Some embodiments provide a kit that includes a control unit shipping container, a solar unit shipping container, a plurality of light unit shipping containers, a solar unit cable, and plurality of light unit cables. The control unit shipping container includes a main distribution box having a plurality of alternating current connections, a controller in digital communication with a bus network, a combustion engine electrical generator having an alternating current output coupled to one of the alternating current connections of the main distribution box, and a first plurality of photovoltaic panels having a direct current output coupled to a first solar inverter that converts the direct current output to an alternating current output that is coupled to one of the alternating current inputs of the main distribution box, wherein the first solar inverter is connected to the bus network. The control unit further includes a first quick connect coupling having a pinout that includes a solar power conductor connected to the AC main distribution box, a battery power conductor connected to the AC main distribution box, a network wire connected to the bus network, and a plurality of second quick connect couplings, each of the second quick connect couplings having a pinout that includes a battery power conductor connected to the AC main distribution box, and a network wire connected to the bus network. The solar unit shipping container includes a second plurality of photovoltaic panels having a direct current output coupled to a second solar inverter that converts the direct current output to an alternating current output, a first rechargeable battery unit coupled to a first battery inverter that converts alternating current to direct current for charging the first rechargeable battery unit and converts direct current discharged from the first rechargeable battery unit to alternating current, and a quick connect coupling having a pinout that includes a solar power conductor connected to the second solar inverter, a battery power conductor connected to the first battery inverter, and a network wire connected to both the second solar inverter and the first battery inverter. Each of the plurality of light unit shipping containers includes an array of area lights supported by a mast, a third plurality of photovoltaic panels having a direct current output coupled to a third solar inverter that converts the direct current output to an alternating current output, a second rechargeable battery unit coupled to a second battery inverter that converts alternating current to direct current for charging the second rechargeable battery unit and converts direct current discharged from the second rechargeable battery to alternating current, and a quick connect coupling having a pinout that includes a battery power conductor connected to the second battery inverter and a network wire connected to both the third solar inverter and the second battery inverter. The solar unit cable includes a first end having a first quick connect coupling and second end having a second quick connect coupling, wherein the solar unit cable includes a solar power conductor, a battery power conductor and a network wire, and wherein the first quick connect coupling of the solar unit cable detachably couples with the quick connect coupling of the solar unit shipping container and the second quick connect coupling of the solar unit cable detachably couples with the quick connect coupling of the control unit shipping container. Each of the plurality of light unit cables includes a first end having a first quick connect coupling and a second end having a second quick connect coupling, wherein each light unit cable includes a battery power conductor and a network wire, and wherein the first quick connect coupling of each light unit cable detachably couples with one of the second quick connect couplings of the control unit shipping container.

Embodiments of the kit may include any one or more component or feature of the system, and the system may include any one or more component or feature of the kit. In addition, method embodiments may include any one or more method of setting up and/or using the kits and/or the system. Still further, certain methods may be embodied as program instructions for implementing or initiating any one or more aspects of the methods described herein. For example, embodiments may include a computer program product comprising a non-volatile computer readable medium and non-transitory program instructions embodied therein, the program instructions being configured to be executable by a processor to cause the processor to perform operations of the method. Other embodiments may provide an apparatus including at least one non-volatile storage device storing program instructions and at least one processor configured to process the program instructions, wherein the program instructions are configured to, when processed by the at least one processor, cause the apparatus to perform various operations.

Although some embodiments have been described as "off-grid" systems or kits, the disclosed embodiments are also compatible with an "on-grid" system. A system that is connected to an electrical grid can both draw power from the grid and supply excess power to the grid. To enable the connection to the grid, the system may include a grid-tied inverter that synchronizes the frequency of the alternating current to the grid frequency. For example, the grid-tied inverter may implement a phase-locked loop (PLL). Other than this connection with the grid, an "on-grid" system may be same as any one of the disclosed "off-grid" embodiments.

FIG. 1 is a plan view of a hybrid off-grid power and lighting system 10 set up at a worksite 12 having a perimeter 16 (outlined with a dashed line). The system shown includes a control unit 20, a solar unit 30, four perimeter light units 40, and three standalone interior light units 50. However, the system is modular and may support more units, fewer units, and/or different combinations of units.

Power generated by the system 10 is used to power lights, such as stadium style lights, that illuminate the entire worksite 12. However, the system may further provide power used for other purposes, such as the facility power for four office/housing units 14 that provide shelter for workers staying at the worksite. Power and control signals may be transmitted between the control unit, the solar unit and the perimeter light units with cables 60 that extend between the units (only one cable is labeled). In a preferred configuration, each perimeter light unit 40 has its own cable 60 that extends directly to the control unit 20.

The standalone interior light units 50 may be functionally similar to the perimeter light units 40, except that they may be physically smaller and mobile, may supply their own power, and are not connected to the rest of the system by cables. Furthermore, the interior light units 50 may provide spot lighting, whereas the perimeter light units 40 preferably provide area lighting. The modular hybrid system can be scaled to accommodate a broad range of surface area lighting needs as well as multi-house deployments. In one non-limiting example, the system may provide 20-300 kW of available power.

The hybrid off-grid power and lighting system 10 may be scalable, modular, and mobile. The system is compliant with OSHA (Occupational Safety and Health Administration) regulations. The system provides worksite lighting and an ample power supply for a broad range of off-grid applications, including oil and gas operations, construction projects, emergency response, and outdoor events. The modular deployment can be sized to scale to specific lighting and other power needs. The system also includes a level of redundancy in power generation and storage. It is a further benefit that the system may include one or more renewable energy sources, such as photovoltaic panels and wind generators, to reduce carbon emissions. In some implementations, it is estimated that the system may reduce fuel use by 65% by using solar panels to charge rechargeable battery units as the primary source of power. As a result, combustion engine electrical generators are only required for about 6 hours out of any day. However, when the combustion engine electrical generator is running, any of the power output by the combustion engine electrical generator that is not consumed by the lights, housing or other facilities is used to recharge the batteries. So, while the photovoltaic panels produce power that reduces the combustion engine electrical generator run time, the system design allowing excess electrical generator power to charge the batteries also contributes to a reduction in combustion engine electrical generator run time. Embodiments that employ remote monitoring and control may quickly respond to any component issues or failures.

Figure 2:
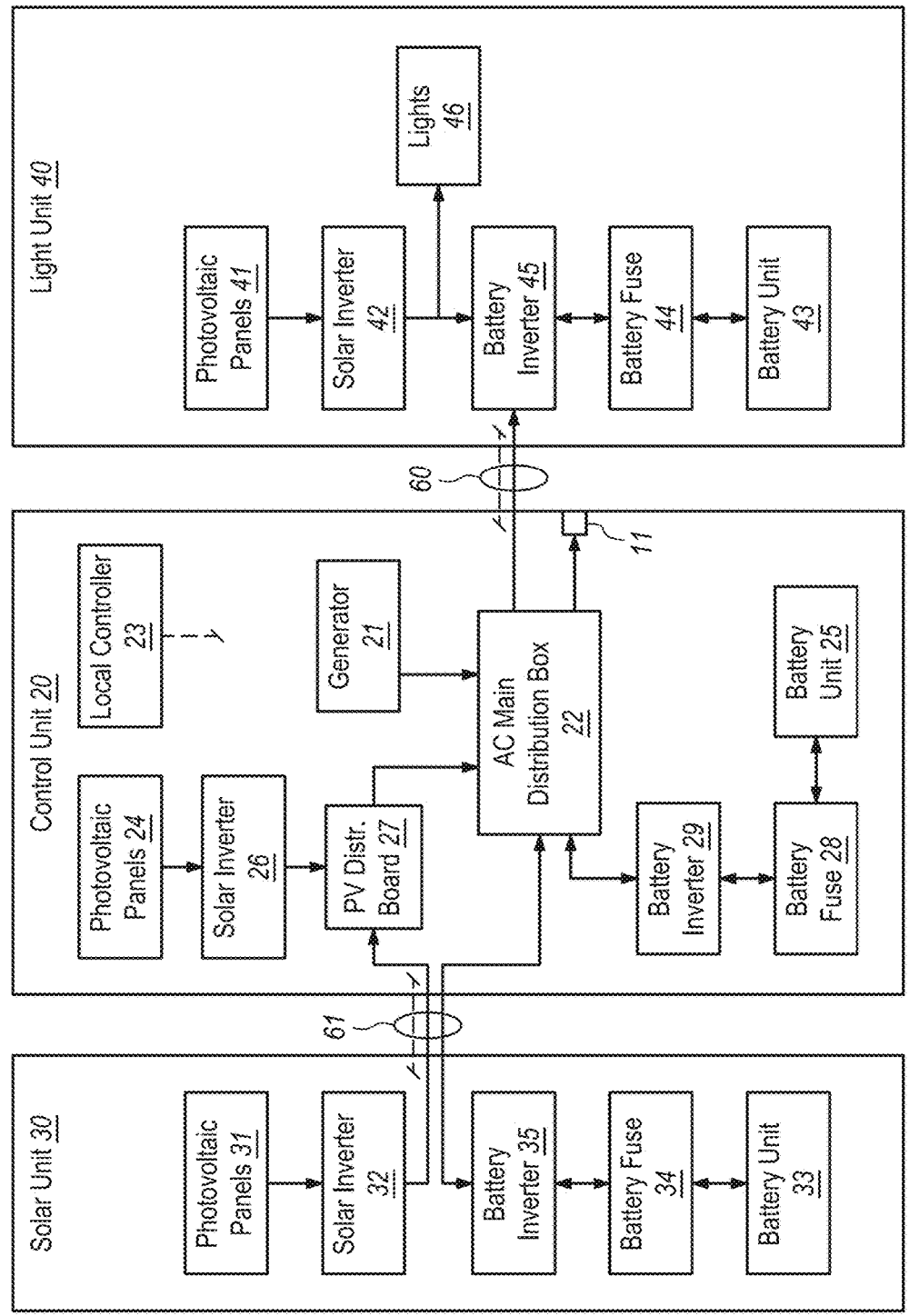
FIG. 2 is an electrical system diagram for a modular hybrid off-grid power and lighting system that includes a solar unit, a control unit and one or more light unit.

FIG. 2 is an electrical system diagram for the modular hybrid off-grid power and lighting system 10 that includes a solar unit 30, a control unit 20 and one or more light units 40. The light unit 40 is shown as a perimeter light unit that is coupled to the control unit 20 with the cable 60, the diagram may also be representative of a standalone light unit 50 other than the cable connection.

Figure 3:
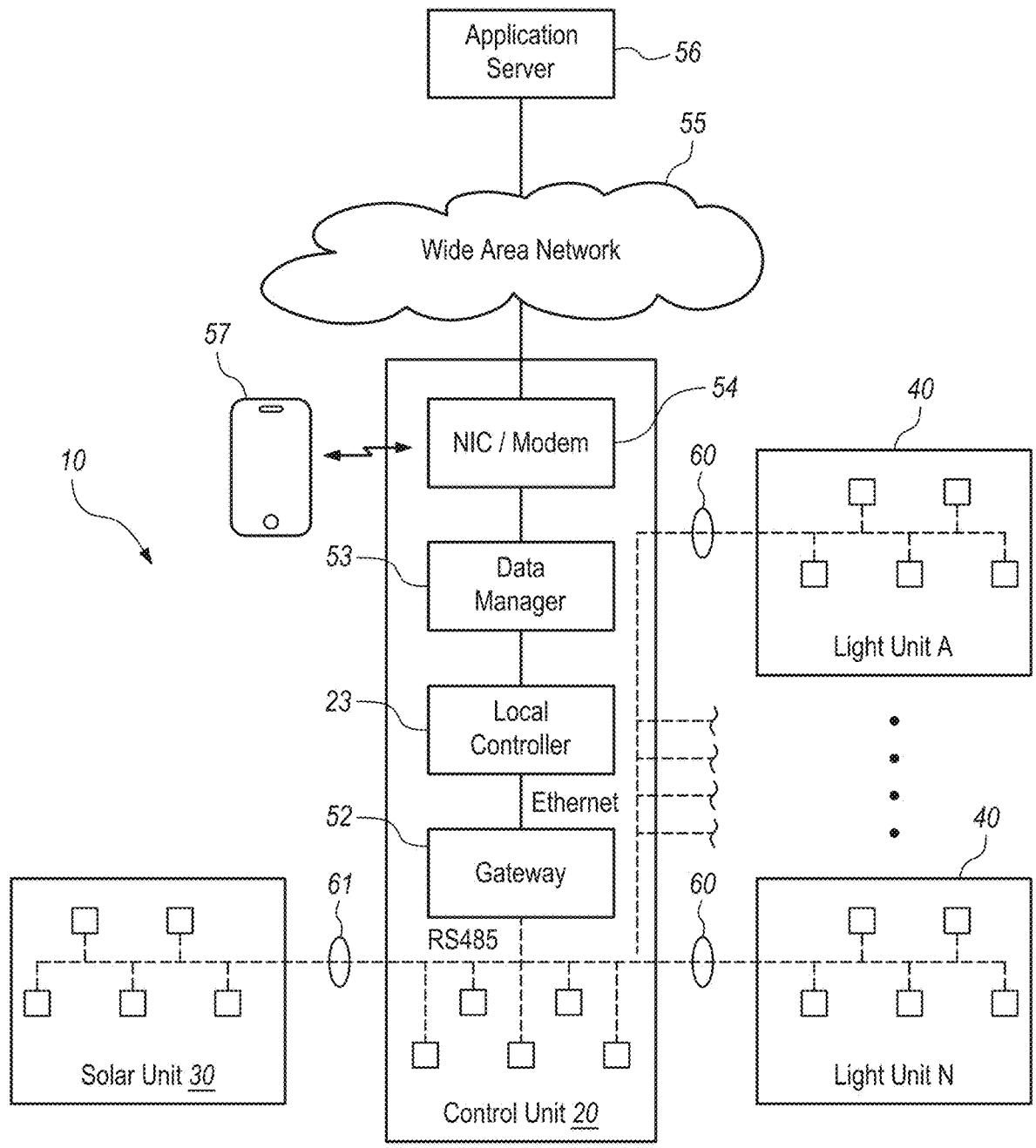
FIG. 3 is a control system diagram for the modular hybrid off-grid power and lighting system of FIG. 2.

The control unit 20 includes a local controller 23 and other communications equipment (as shown in FIG. 3). The control unit 20 also includes an appropriately sized combustion engine electrical generator 21, photovoltaic panels (solar panels) 24, and a battery unit 25. Although the combustion engine electrical generator 21 has its AC voltage output connected directly to an AC main distribution box 22, the photovoltaic panels (solar panels) 24 provide DC voltage to the solar inverter 26 which provides AC voltage to the PV (Photovoltaic) distribution board 27. Along with AC voltage from the solar inverter of the solar unit 30, the PV distribution board 27 provides AC voltage to a separate input to the AC main distribution board 22. The battery unit 25 is also coupled to the AC main distribution board 22 via the battery fuse 28 and the battery inverter 29. The battery inverter 29 and battery fuse 28 enable both charging and discharging of the battery unit 25.

In one specific implementation, the control unit 20 may be built into a 40 foot shipping container and may include six 400 W solar panels 24, a 33 kW lithium battery bank or unit 25, an 80 kW diesel engine electrical generator 21, a 550 gallon fuel tank (not shown), quick connect cables and connectors (see FIGS. 8A and 8B), and components for remote monitoring and control of the system (see FIG. 3). Power generated by the control unit 20 may be used to operate the local controller 23 and other communication equipment, may provide facility power to an external device via a port or outlet 11, may be directed to the battery unit 25 of the control unit, or may be directed to the battery units of the solar unit 30 and/or light unit 40. The control unit 20 may manage the load of the deployed system and determines when the electrical generator 21 is needed to provide adequate power for the lights or other uses. For example, the AC main distribution box 22 may receive AC power from the solar unit 30 and the electrical generator 21 and the local controller 23 may switch on the electrical generator 21 when the batteries are approaching their depth of discharge limit.

The solar unit 30 includes photovoltaic panels 31 that supply DC voltage to a solar inverter 32 that converts the DC voltage to AC voltage that is output to the control unit. The solar unit 30 also includes a battery unit 33 that is coupled to the AC main distribution board 22 of the control unit 20 via the battery fuse 28, the battery inverter 29 and a cable 61. The battery inverter 35 and battery fuse 34 enable both charging and discharging of the battery unit 33. Accordingly, the battery unit 33 may be charged with electrical power received over the cable 61 from the AC main distribution box 22 of the control unit. The solar unit 30 may be provided in the system 10 to provide additional solar energy capture and battery storage to help scale the solar contribution needed for the off-grid system.

In one specific implementation, the solar unit may be built into a 20 foot shipping container and may include eighteen 400 W solar panels 31, a 33 kW lithium battery bank or unit 33, and a quick connect cable 61. The battery unit may include thirty-three temperature-controlled Li-ion batteries, and a series of inverters operating in a master-slave relationship to sync the AC current going to the control unit.

The light unit 40 is somewhat similar to a solar unit, except that the light unit includes lights 46 such as light-emitting diode (LED) arrays. Another difference in the embodiment shown is that battery unit 43 may be charged with power from the AC main distribution board 22, but light unit 40 does not provide power to the control unit 20. However, the light unit 40 includes photovoltaic panels 41 that supply DC voltage to a solar inverter 42 that converts the DC voltage to AC voltage that is output to the lights 46 and/or the battery unit 43 via the battery inverter 45 and the battery fuse 44. The battery inverter 45 and battery fuse 44 enable both charging and discharging of the battery unit 43. Accordingly, the battery unit 43 may be charged with electrical power received over the cable 60 from the AC main distribution box 22 of the control unit or with electrical power generated by the photovoltaic panels 41 of the light unit 40 itself.

In one specific implementation, the perimeter light unit 40 may be built into a 20 foot shipping container and may include twelve 400 W solar panels, a 22 kW lithium battery bank or unit, a 65 foot (height) telescoping mast, four 400 W LED lights, and a quick connect cable. Any number of perimeter light units 40 may be connected to the control unit 20 with a separate cable (power lines and control lines) to connect the control unit direct to each of the perimeter light units.

In a further specific example, the solar inverter 26 of the control unit 20 may be a Sunny Boy 3.0); the AC main distribution box 22 of the control unit 20 may be a SMA Multicluster Box; the solar inverter 32 of the solar unit 30 may be a Sunny Boy 7.0; the battery inverter 35 of the solar unit 30 may be provided by a Sunny Island 6049 Master and two Sunny Island 6049 Slaves; the battery fuse 34 of the solar unit 30 may be a BATFUSE B.03; the solar inverter 42 of the light unit 40 may be a Sunny Boy 3.8; the battery inverter 45 of the light unit 40 may be a Sunny Island 4548; and the battery fuse 44 of the light unit 40 may be a BATFUSE B.01. The Sunny Boy 3.0, Sunny Boy 7.0, and Sunny Boy 3.8 are solar inverters with different power capacities and/or a different number of input/output connectors. The Sunny Island 6048 Master, Sunny Island 6048 Slave (two instances), and Sunny Island 4548 are battery inverters with different power output capacities. The BATFUSE B.03 and BATFUSE B.01 are battery fuses that differ in the number of battery inverters that may be connected to the battery fuse and the total power output (kW). Sunny Boy 3.0, Sunny Boy 7.0, Sunny Boy 3.8, Sunny Island 6048 Master, Sunny Island 6048 Slave, Sunny Island 4548, SMA Multicluster Box, BATFUSE B.03 and BATFUSE B.01 are each available from SMA Solar Technology AG of Niestetal, Germany.

It is also an option to have a wind generator replace or supplement the photovoltaic panels in any of the units 20, 30, 40. However, since the light unit 40 already includes an upright mast with heights up to about 65 feet, a wind generator may be added to the mast. For example, a wind generator may be mounted to the top of the mast with the solar panels just below the wind generator.

An interior light unit (see interior light unit 50 of FIG. 1) may be functionally similar to the light unit 40, but without a connection to another unit. In one specific implementation, an interior light unit 40 may be built on a 4 foot by 4 foot container and may have five 400 W solar panels, a 6.8 kW Li-ion battery bank, a solar inverter, and a telescopic 25 foot mast with a cluster of four 100 W LED short cast lights providing 52,000 lumens. Optionally, the interior light unit may further include a 6 kW backup combustion engine electrical generator and a 20 gallon fuel tank. The interior light units are moved more frequently to cover dynamically changing work areas. This mobile unit may be mounted on either a small trailer or a lightweight moveable skid to allow for forklift movement within the worksite.

FIG. 3 is a communication and control diagram for the modular hybrid off-grid power and lighting system 10 of FIG. 2. As previously described, the system 10 includes a control unit 20, a solar unit 30 and one or more light units 40. The local controller 23 may be part of an Ethernet network that communicates with a gateway 52. The gateway is a unit of networking hardware that allows data transfer from one network to another, typically including protocol translation. In this instance, an RX-485 protocol may be used to establish a network bus that connects to any number and combination of the components in the system 10 shown in FIG. 2. The components of the solar unit 30 are able to communicate with the network bus in the control unit 20 via a data connection through the cable 61 and the components each light unit 40 are able to communicate with the network bus in the control unit 20 via a data connection through a respective cable 60. The gateway 52 is responsible for translating protocols between the RS-485 network and the Ethernet network.

The local controller 23 supports remotely monitoring and control of the system 10. The data manager 53 collects data generated by the system and available through the local controller 23. The data manager 53 may also prepare the data for transmission over a network interface controller (NIC) and/or modem 54. Using the NIC 54, the control unit 20 may communicate over a wide area network (WAN) 55, such as the Internet or cellular network, with an application server 56. The local controller 23, data manager 53 and/or application server 56 may perform diagnostics, measure usage, and generate carbon reduction reports. Furthermore, the local controller 23, data manager 53 and/or application server 56 may participate in monitoring and control of the system 10, including the components shown in FIG. 2. Furthermore, a personal computing device, such as a smartphone or tablet computer 57 may be used onsite to communicate wirelessly with the NIC 54, such that service personnel at the worksite may use the device 57 to monitor and control the system.

Figure 4A:
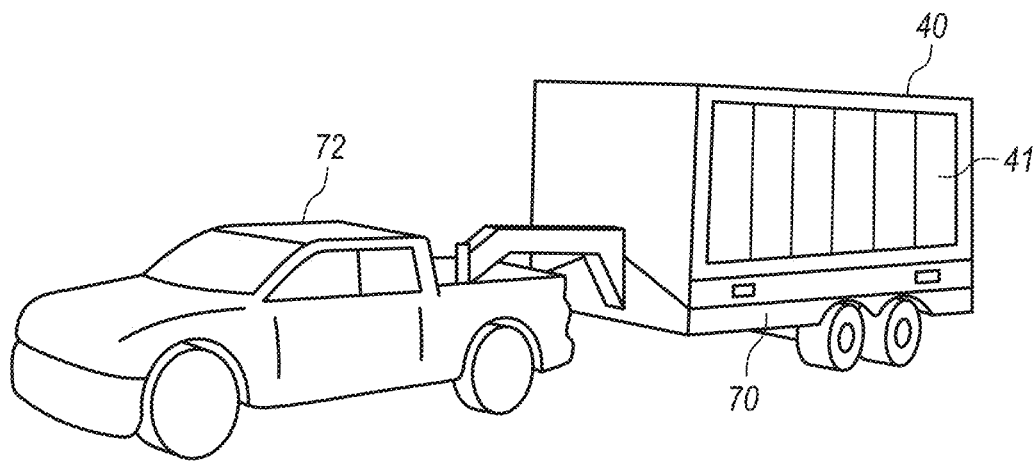
FIG. 4A is a perspective view of a modular unit of the system being delivered to a worksite on a trailer being pulled by a truck.

FIG. 4A is a perspective view of a modular unit of the system being delivered to the worksite on a trailer 70 being pulled by a truck 72. The modular unit may be any of the units 20, 30, 40, 50, but will be referred to here as a light unit 40 to simplify the discussion. The light unit 40 includes a pair photovoltaic panels (solar panels) 41, each covering the majority of one side of the unit.

Figure 4B:
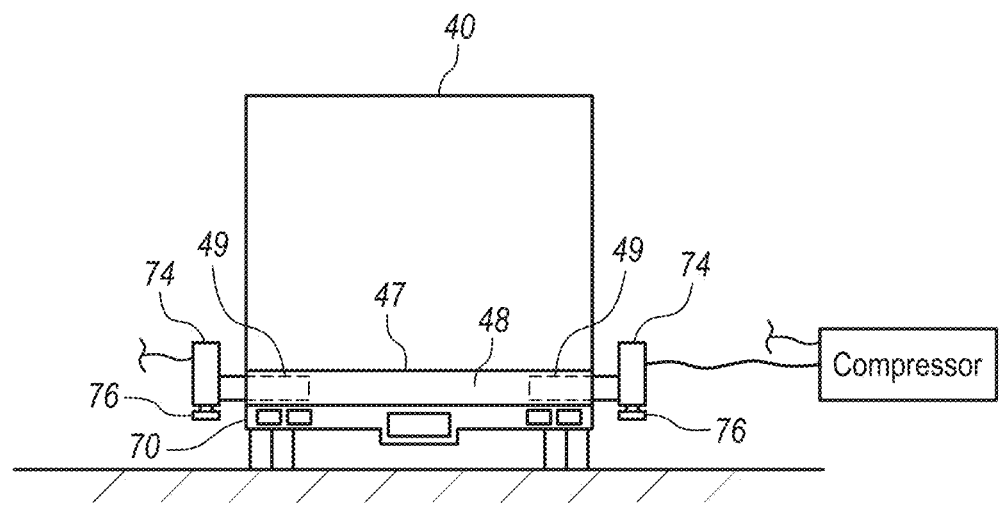
FIG. 4B is an end view of the modular unit sitting on the trailer at the worksite.
Figure 4C:
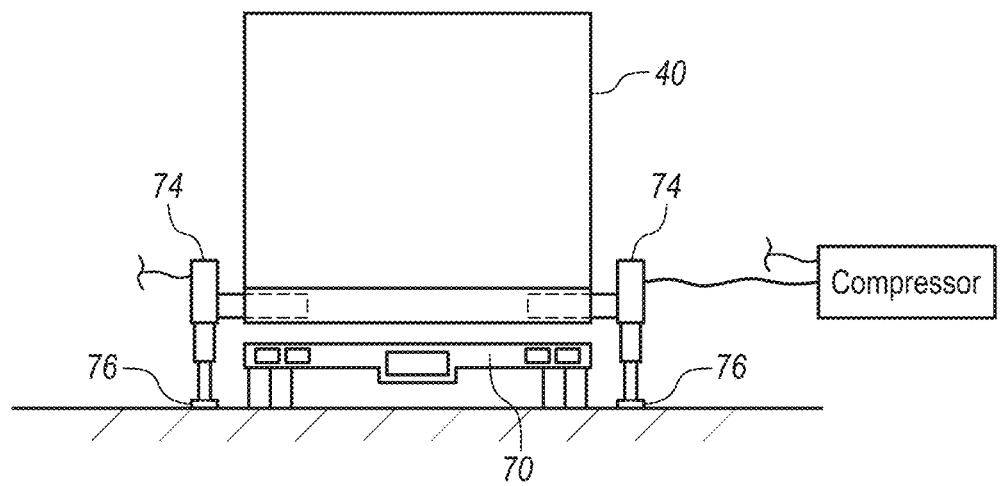
FIG. 4C is an end view of the modular unit raised above a bed of the trailer by extending a set of hydraulic or pneumatic outriggers.

FIG. 4B is an end view of the light unit 40 sitting on the trailer 70 at the worksite. The shipping container of the light unit 40 has a floor 47 with horizontal channels 48 adapted to receive a rigid arm 49 of an outrigger. A distal end of each rigid arm 49 supports a hydraulic cylinder 74 with a foot 76 at the lower end. Four such outriggers are secured about the perimeter of the floor 47. A hydraulic pump or compressor is connected to each of the four outriggers for applying hydraulic pressure to extend each cylinder FIG. 4C is an end view of the light unit 40 raised above the bed of the trailer by extending the set of hydraulic outriggers. For example, the light unit may be raised vertically until it is about one foot above the trailer 70.

Figure 4D:
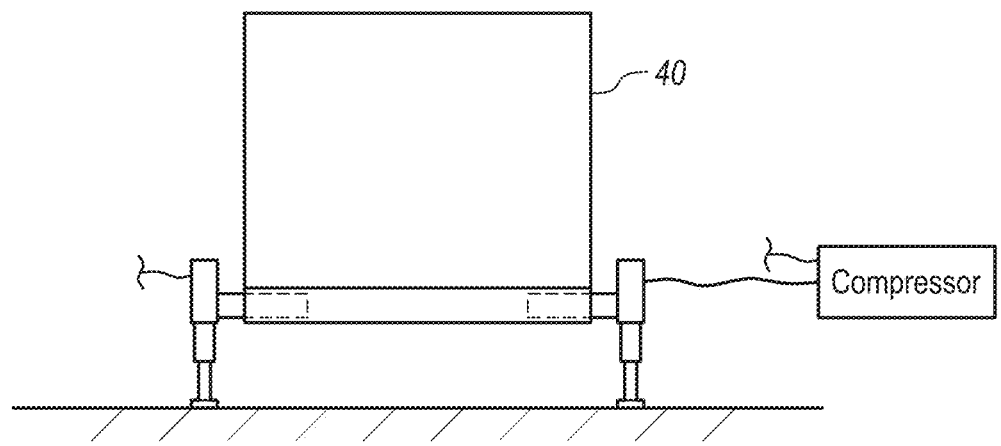
FIG. 4D is an end view of the raised modular unit after the trailer has been pulled out from beneath the modular unit.

FIG. 4D is an end view of the raised light unit 40 after the trailer has been pulled out from beneath the modular unit. As shown, the light unit 40 may be 2-3 feet above the ground.

Figure 4E:
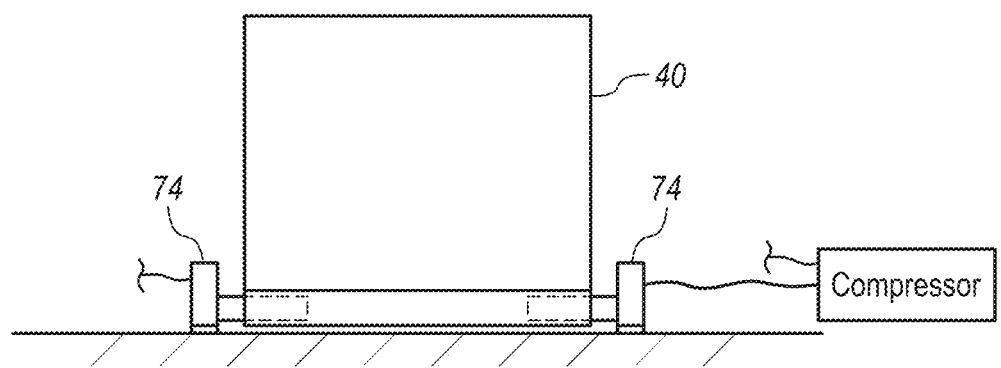
FIG. 4E is an end view of the modular unit resting on the ground as a result of retracting the set of hydraulic or pneumatic outriggers.

FIG. 4E is an end view of the light unit 40 resting on the ground as a result of retracting the set of hydraulic cylinders 74. Preferably, the rigid arms 49 will stay horizontally extended, maintaining contact with the ground to function as stabilizers that prevent tipping of the light unit 40 in the case of heavy wind or storms.

Figure 5A:
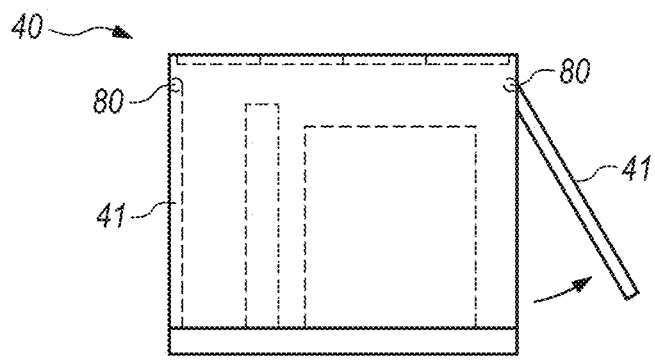
FIG. 5A is a schematic end view of a modular unit as one of the solar panels is being deployed.

FIG. 5A is a schematic end view of a light unit 40 as one of the two sets of solar panels 41 is being deployed. Each panel 41 has an upper edge with a hinged connection 80 to the shipping container. Accordingly, each solar panel 41 may swing upward so that the photovoltaic cells face toward the sun.

Figure 5B:
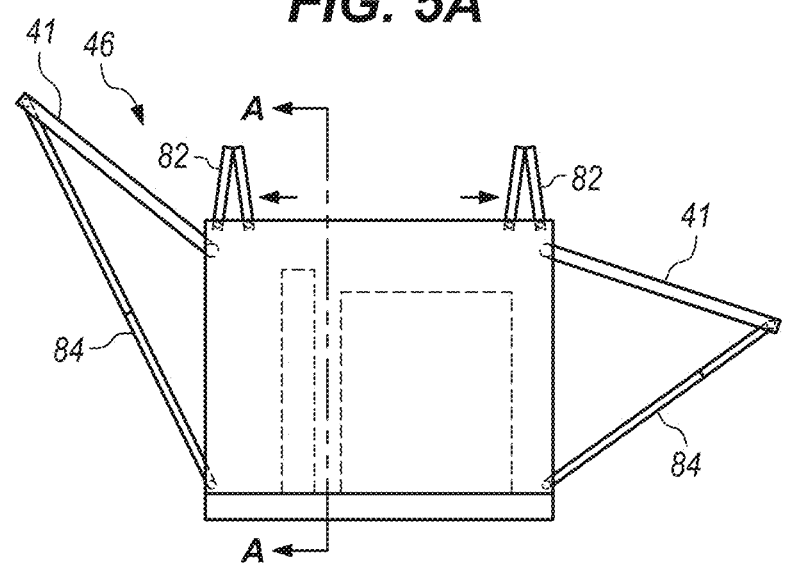
FIG. 5B is a schematic end view of the module unit after the solar panels have been deployed to an operating position and a pair of roof panels have been opened.

FIG. 5B is a schematic end view of the light unit 40 after the solar panels 41 have been deployed to an operating position and a pair of roof panels 82 have been opened by sliding apart. The solar panels 41 may be moved to the operating position shown with an actuator or by manual force. The element 84 may represent an actuator or a manual brace. With an actuator, the system may optionally provide control of the angle of the panels 82 to maximize solar energy collection.

Figure 6A:
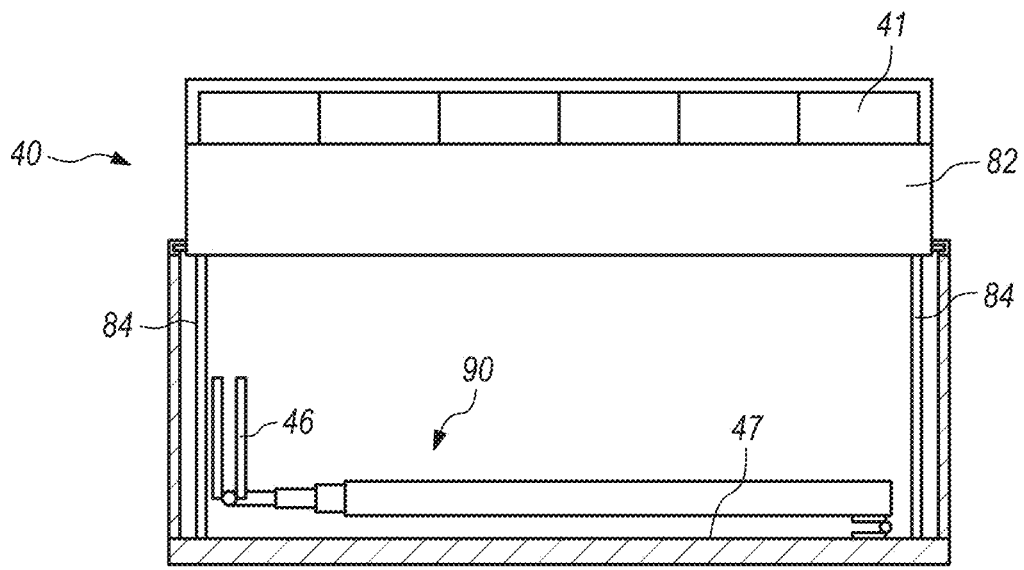
FIG. 6A is a cross-sectional side view of the modular unit taken along line A-A in FIG. 5B to show a light mast in a stowed position.

FIG. 6A is a cross-sectional side view of the light unit 40 taken along line A-A in FIG. 5B to show a telescopic mast 90 in a stowed position. The stowed position allows the telescopic mast 90 and the lights 46 to be fully enclosed and protected within the shipping container during transportation to the worksite. As shown, the solar panel 41 is in an operating position and the roof panel 82 is open. Accordingly, the telescopic mast 90 may be subsequently deployed.

Figure 6B:
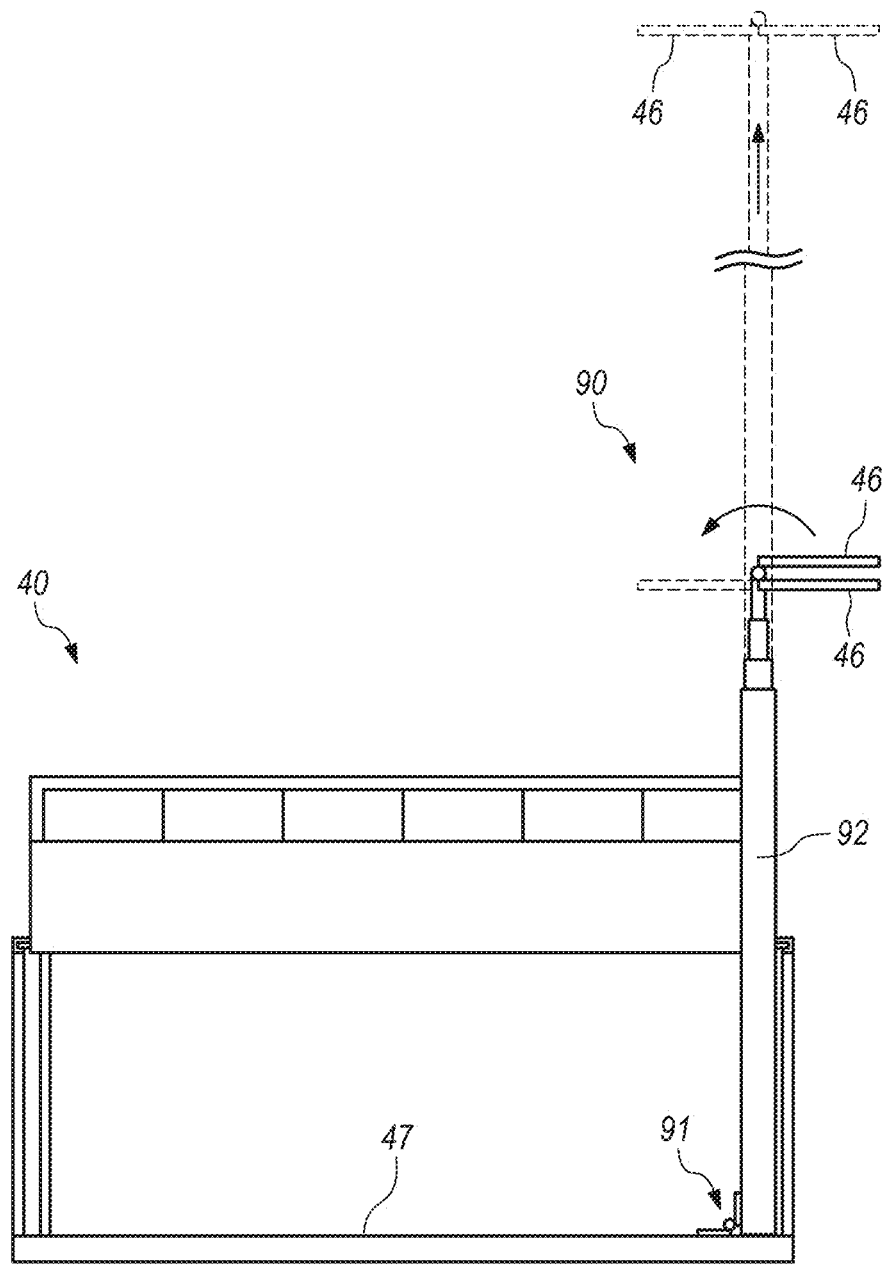
FIG. 6B is a cross-sectional side view of the module unit as shown in FIG. 6A after the light mast has been hingedly moved to an upright position and extended into a deployed position.

FIG. 6B is a cross-sectional side view of the module unit as shown in FIG. 6A after the light mast has been moved to an upright position (as shown) and extended between the roof panels 82 into a deployed position (as shown in dashed lines). A hinge 91 has one side secured to the floor 47 and one side secured to the first section 92 of the mast 90 to facilitate movement of the mast from the stowed position (FIG. 6A) and the upright position as shown. Cabling for the lights 46 may be provided in spools attached to the units. The LED lights may exceed all 1926.56 and 1915.82 OSHA foot-candle requirements for construction and land site illumination. A description of one embodiment of a mast that is pneumatically deployable is provided in reference to FIGS. 9A to 9D.

Figure 7:
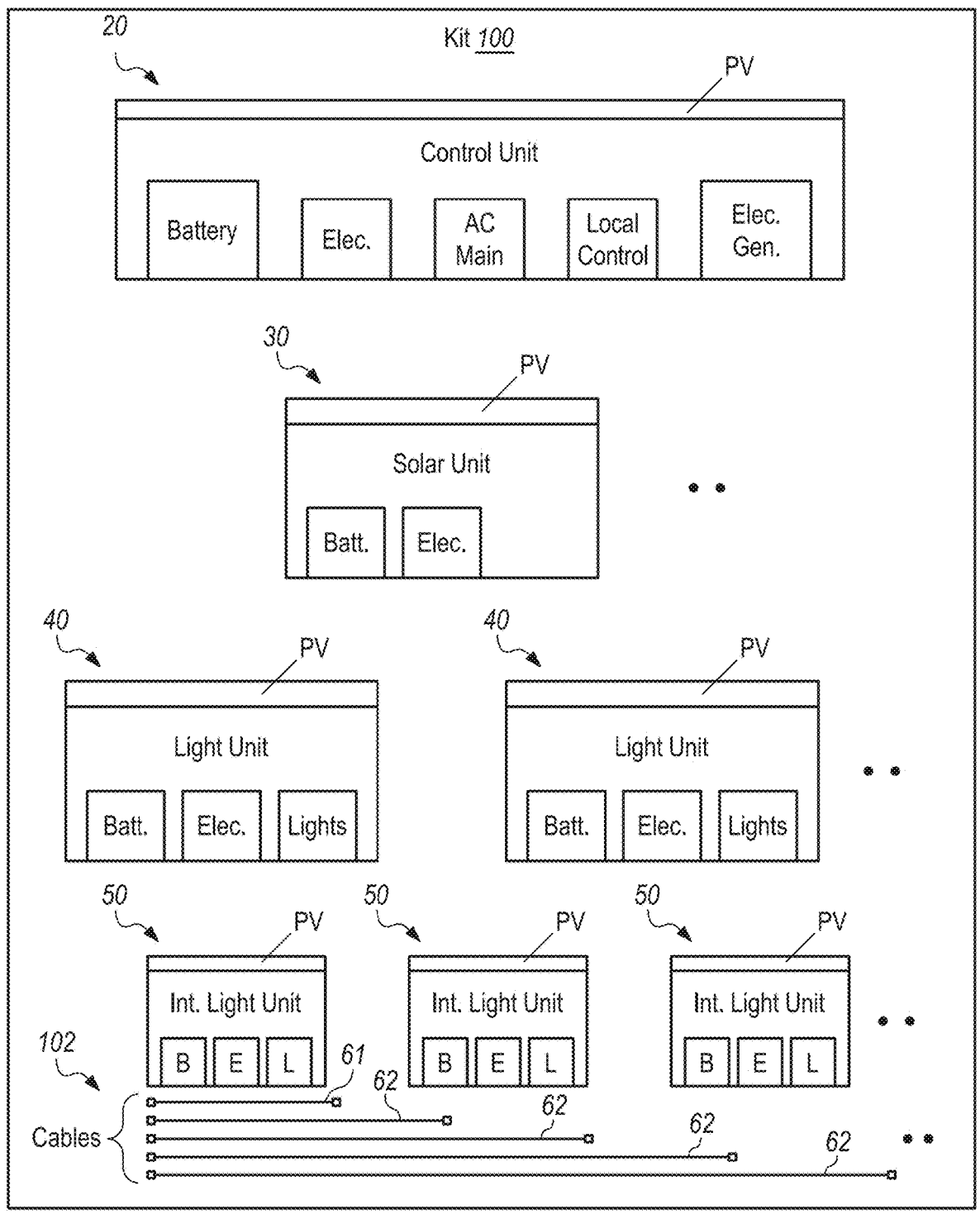
FIG. 7 is a diagram of a kit of components that may be used to set up a hybrid off-grid power and lighting system at a worksite.

FIG. 7 is a diagram of a kit 100 of components that may be used to set up a hybrid off-grid power and lighting system 10 at a worksite 12 as shown in FIG. 1. The modular components of any particular kit may vary, but the kit 100 is shown to include one control unit 20 (40 foot shipping container; 40'L×8'W×8'6"H), one solar unit 30 (20 foot shipping container; 20'L×8'W×8'6"H), four perimeter light units 40 (20 foot shipping container; 20'L×8'W×8'6"H), and three interior light units 50 (4 foot×6 foot container). Each of the units 20, 30, 40, 50 are illustrated with some of the major elements of the units, but the illustration is not intended to be exhaustive. The kit 10 further includes a set of cables 102, including one solar unit cable 61 and four light unit cables 62. The kit can be easily modified to include additional components or fewer components for any particular implementation. Furthermore, the kit is beneficial in that it is easy to haul each component to the worksite and then assemble the system.

Figure 8A:
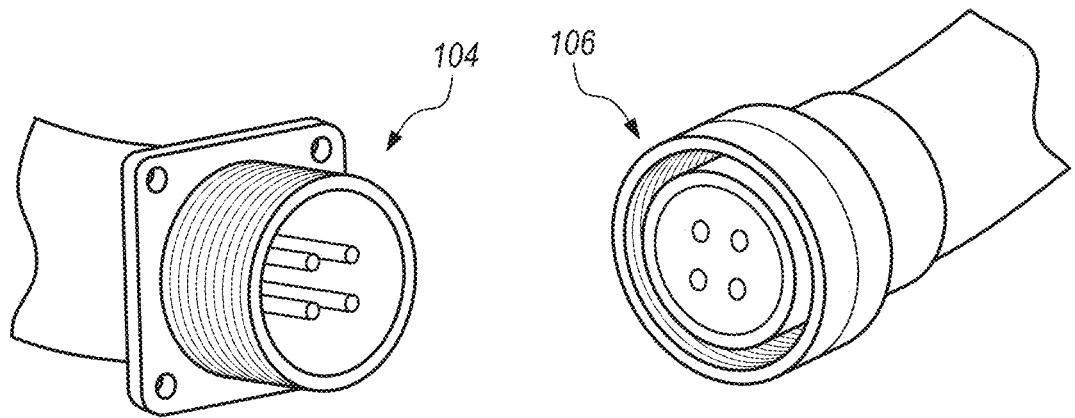
FIG. 8A is a perspective view of a mating pair of quick connect couplings.

FIG. 8A is a perspective view of a mating pair of quick connect couplings. These or similar couplings may be used on the ends of a cable (also referred to as an "umbilical"). For example, a cable may have socket-type (female) connector ends 106 and each of the control unit, solar unit and light units may have pin-type (male) connector ends 104. The mating pins and sockets may collectively carry a mix of electrical power and/or communication signals. For the embodiment shown, the connector end 106 may be aligned with the connector end 104 such that the pins will be received within the sockets. Next, the internally threaded sleeve of the connector end 106 is turned to thread the sleeve onto the externally threaded coupling of the connector end 104.

Figure 8B:
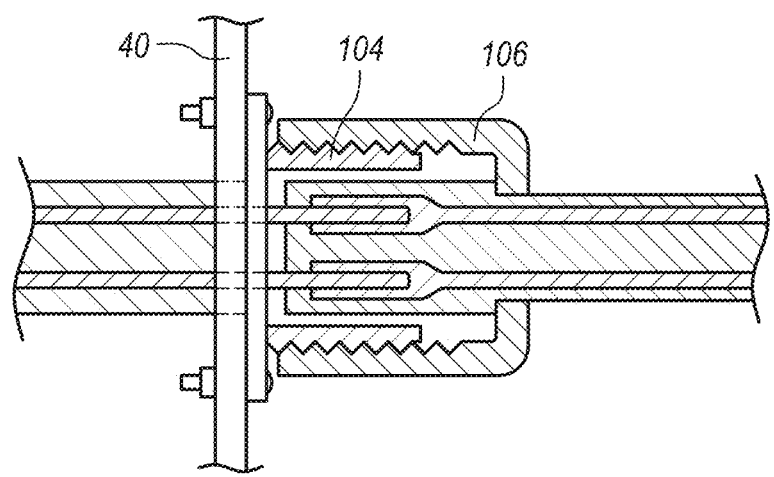
FIG. 8B is a cross-sectional side view of the pair of quick connect couplings after they have been connected to form a completed circuit between the conductors in each coupling.
Figures 9A, 9B, 9C, 9D:
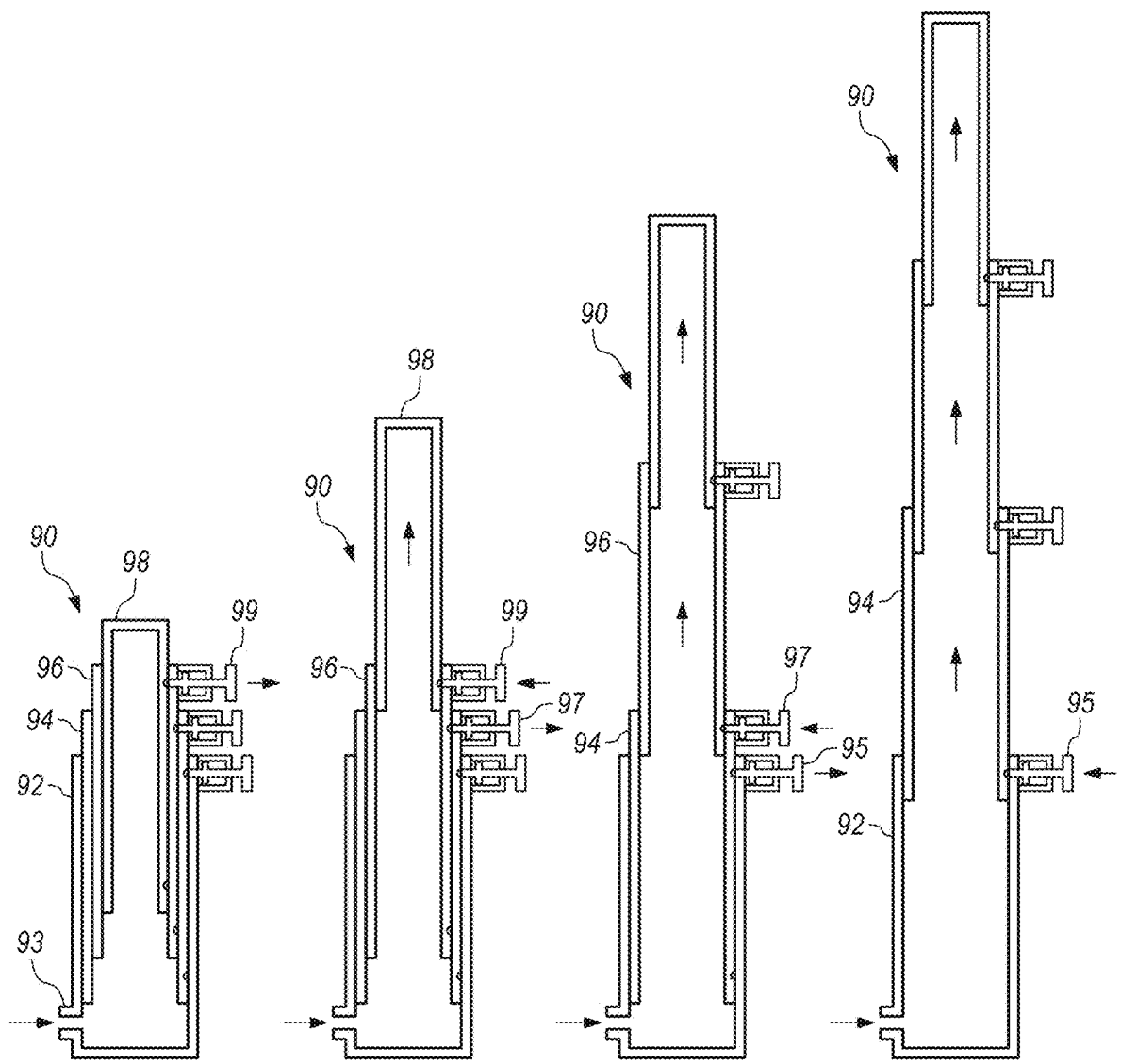
FIGS. 9A to 9D are schematic diagrams illustrating a telescopic mast being deployed with pneumatic pressure.

FIG. 8B is a cross-sectional side view of the pair of quick connect couplings 104, 106 after they have been connected to form a completed circuit between each of the pins and sockets.

FIGS. 9A to 9D are schematic diagrams illustrating a telescopic mast 90 being deployed with pneumatic pressure. The telescopic mast 90 is illustrated with 4 sections but may have as many as 10 sections with a total deployment height of up to about 65 feet. The raising or lowering of the sections is handled pneumatically using an air compressor. In this illustration, the mast 90 includes a first (outer) section 92, a second section 94, a third section 96, and a fourth (inner) section 98 arranged in a telescopic cylinder. The second section 94 slidably engages the inner wall of the first section 92, the third section 96 slidably engages the inner wall of the second section 94, and the fourth section 99 slidably engages the inner wall of the third section 96. Each of the second, third and fourth sections has an upper and lower hole that extends only partially through the sidewall of the section to receive the distal end of a spring-loaded pin.

To raise the mast 90, an air compressor is connected to a port 93 in the first (bottom) section to apply air pressure within the telescopic mast. In reference to FIG. 9A, a spring-loaded pin 99 is manually pulled outward so that a distal end of the pin 99 is withdrawn from an upper hole in the top section 98. As the top section 98 elevates, the pin 99 may be released so that it will engage the lower hole in the top section 98. This process is repeated from each successive section from top to bottom until the desired height of the mast has been achieved or the last internal section has been elevated. With the pins of one section secured in the lower hole of the next inner section, the telescopic mast will not collapse and the compressor may be turned off. To lower the mast, the pins may be successively pulled out of the lower hole in the adjacent inner section such that the mast lowers until the pin engages the upper hole in that section. The rate of collapse may be controlled by limiting the rate at which air escapes from the telescopic mast. The pins are pulled and re-engaged from bottom to top until either the desired height of the mast has been achieved or the last section has been lowered.

Figure 10A:
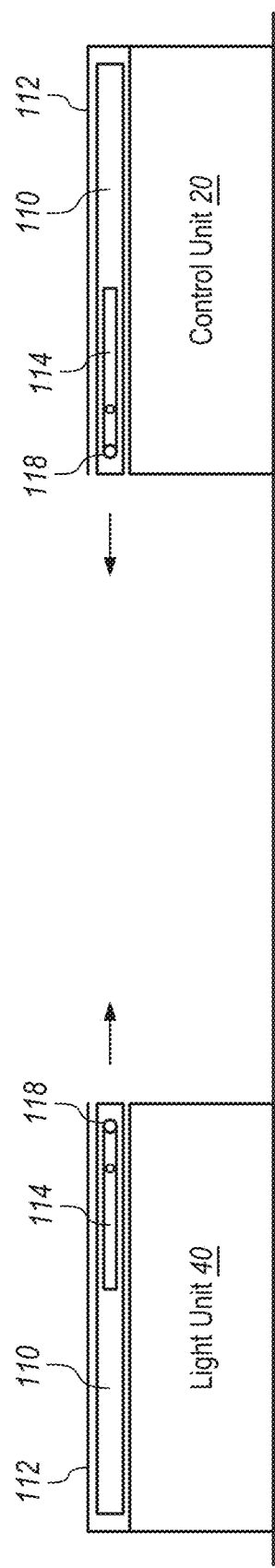
FIGS. 10A and 10B are side views of two modular units that each have a cable tray in a stowed position and a deployed position, respectively.
Figure 10B:
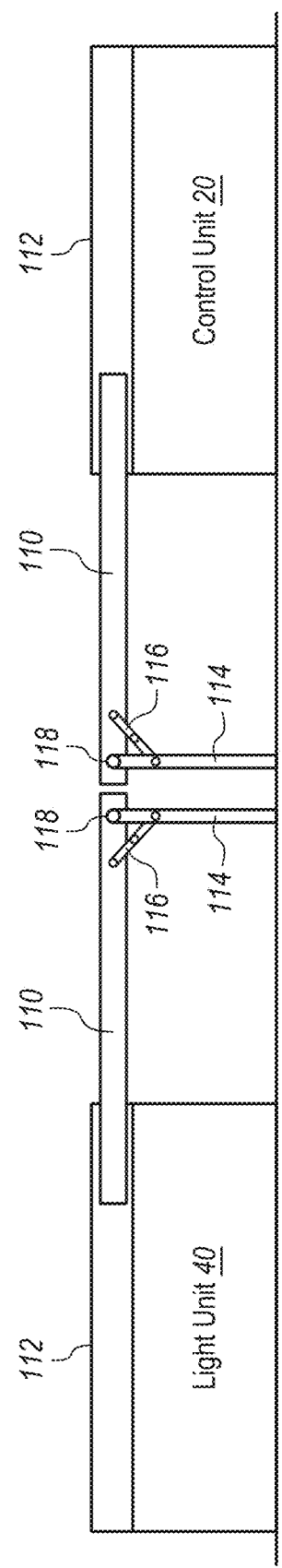

FIGS. 10A and 10B are side views of two modular units that each have a cable tray 110 in a stowed position (FIG. 10A) and a deployed position (FIG. 10B), respectively. Furthermore, each cable tray 110 has a support leg 114 that is secured to the cable tray with a pivot 118. The cable tray 110 may have a length similar to the length of the shipping container that forms the units. In one example, the cable trays are each 20 feet long and may have a width of about 2 feet.

In FIG. 10B, the cable trays 110 have been pulled out from each of the two units 20, 40 that should be connected via one or more cable. Optionally, the trays 110 may be supported by bearings that reduce the force required to pull the trays out of a channel 112 and push the trays back into the channel 112. Accordingly, the two trays 110 may extend toward each other to form a 40 foot tray for supporting one or more cable above the ground where the cable will avoid damage and personnel can walk under the tray.

Once extended from the channel 112, the support legs 114 drop down into a vertical position to support the tray 110. A hinged cross brace 116 may be used to stop the support legs 114 in a vertical position. Optionally, the two trays 110 may be connected at their distal ends to provide additional support and stability. The trays 110 are then able to support heavy electrical wiring.

Figure 11A:
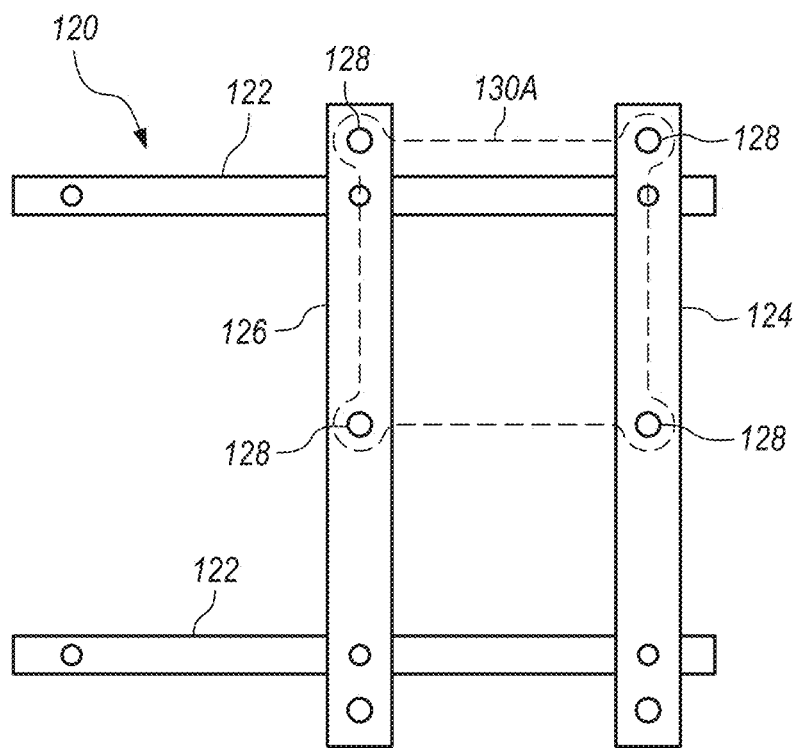
FIGS. 11A and 11B are top views of a pair of rails, including at least one sliding rail, on a pair of tracks for quickly securing either of at least two different sizes of generators.
Figure 11B:
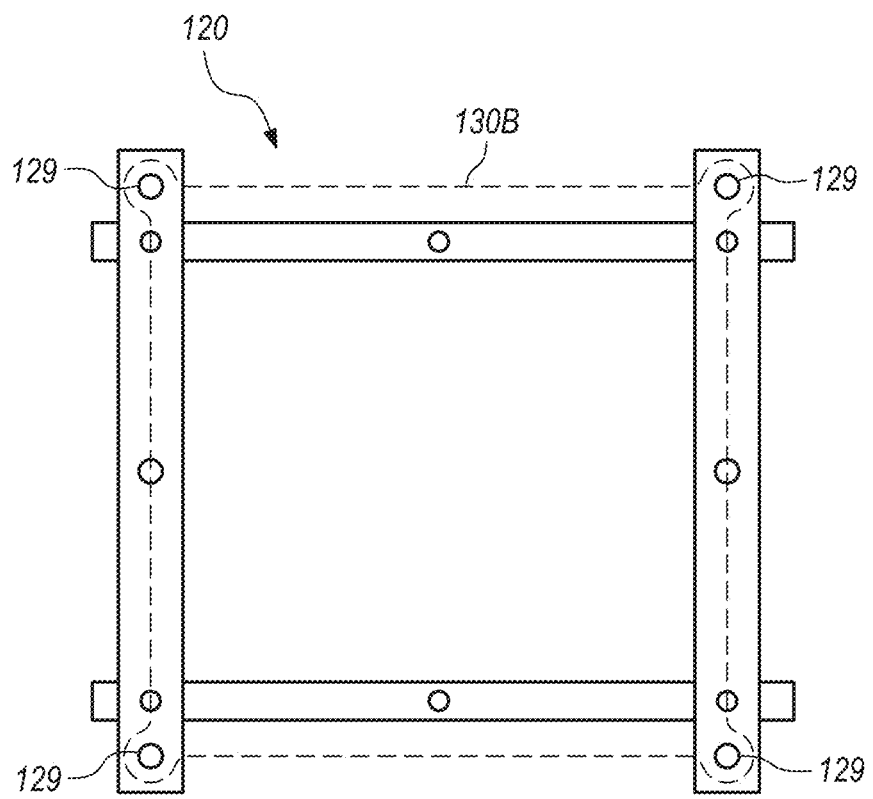

FIGS. 11A and 11B are top views of an adjustable mechanism 120 for securing different sizes of generators. The mechanism 120 includes a pair of parallel rails 124, 126 including at least one sliding rail 126, on a pair of parallel tracks 122 for quickly securing either of at least two different sizes of generators. The parallel tracks 122 may be secured to the floor of the control unit 20 and the parallel rails 124, 126 may be selectively secured in one or more positions along the tracks 122. Furthermore, each of the parallel rails 124, 126 includes multiple bolt holes and various spacings to accommodate a connector pattern of various generators. Accordingly, any one of several generators may be secured in the control unit 20 in a short amount of time, by adjusting the location of the sliding rail 126 and using a different set of bolt holes.

In FIG. 11A, the rail 124 is fixed in position and the sliding rail 126 is temporarily secured to the tracks 122 in a close position. As shown, the four bolt holes 128 are arranged to connect with the bolt hole pattern of a first small generator having a profile 130A.

In FIG. 11B, the sliding rail 126 has been slid to the left to a second position and temporarily secured to the tracks 122. Having increased the spacing between the rails 124, 126 and using a different set of bolt holes 129 on the rails 124, 126, a second larger generator having a profile 130B may be secured. Accordingly, a generator size may be selected to meet a given objective. For example, a generator with a 2 foot by 2 foot bolt pattern may be secured with the mechanism 120 configured as in FIG. 11A, and a generator with a 4 foot by 4 foot bolt pattern may be secured with the same mechanism 120 configured as in FIG. 11B.

STRUCTURE FOR STOWING AND DEPLOYING SOLAR PANELS

Some embodiments provide an apparatus for supporting solar panels. The apparatus comprises first and second opposing end panels, the first end panel forming a first stationary track and the second end panel forming a second stationary track. The apparatus further comprises first and second rigid frames, each rigid frame being configured to secure a solar panel, wherein the second rigid frame has a first end secured to the first end panel and a second end secured to the second end panel. Still further, the apparatus comprises first and second trolleys, wherein the first trolley is supported by the first stationary track and moveable along the first stationary track, wherein the second trolley is supported by the second stationary track and moveable along the second stationary track, and wherein the first rigid frame has a first end secured to the first trolley and a second end secured to the second trolley. The apparatus also comprises first and second arms, wherein the first arm forms a first deployable track and the second arm forms a second deployable track. The first arm is selectively positionable in a first deployed position in which the first deployable track extends in a first lateral direction in alignment with the first stationary track and the second arm is selectively positionable in a second deployed position in which the second deployable track extends in the first lateral direction in alignment with the second stationary track. Positioning the first arm in the first deployed position and the second arm in the second deployed position enables the first trolley to be moved along the first stationary track to the first deployable track and the second trolley to be moved along the second stationary track to the second deployable track.

In some embodiments, the first arm may be selectively positionable in the first deployed position by attaching the first arm to the first end panel, wherein the first arm is detachable from the first end panel. Similarly, the second arm may be selectively positionable in the second deployed position by attaching the second arm to the second end panel, wherein the second arm is detachable from the second end panel. The first and second arm, or any other arm described herein, may be attached in any suitable manner, such as with bolts or mating hooks and slots.

In some embodiments, the first arm may be pivotally secured to the first end panel and selectively positionable in the first deployed position by pivoting the first arm from a first stowed position. Similarly, the second arm may be pivotally secured to the second end panel and selectively positionable in the second deployed position by pivoting the second arm from a second stowed position. The first and second arms preferably pivot about a substantially vertical axis when the apparatus is secured to a substantially horizontal base structure.

In some embodiments, the first end of the first rigid frame may be pivotally secured to the first trolly and the second end of the first rigid frame may be pivotally secured to the second trolley. Separately, the first end of the second rigid frame may be pivotally secured to the first end panel and the second end of the second rigid frame may be pivotally secured to the second end panel.

In some embodiments, the apparatus may include a first frame latch for selectively preventing the first rigid frame from pivoting relative to the first trolley. Separately, a second frame latch may be provided for selectively preventing the second rigid frame from pivoting relative to the first end panel. Optionally, the frame latches may be provided at each end of the frames to prevent the rigid frames from pivoting and hold them more securely during transportation or use.

In some embodiments, the apparatus may include a first trolley latch for selectively securing the first trolley in a fixed positioned along the first stationary track. In a separately option, the apparatus may include a second trolley latch for selectively securing the first trolley in a fixed positioned along the first deployable track of the first arm. However, the apparatus may include both trolley latches for both the first stationary track and the first deployable track and may include additional trolley latches for both the second stationary track and the second deployable track.

In some embodiments, the apparatus may include a first mounting bracket connected to the first end panel for securing the first end panel to a top of a base structure and a second mounting bracket connected to the second end panel for securing the second end panel to the top of the base structure. In one option, the mounting brackets may be secured to the base structure with bolts or welding. For example, the base structure may be a shipping container, trailer, a box truck, or other mobile structure. In a separate option, the first and second end panels may extend across a major portion of the width of the base structure, wherein the first deployed position of the first arm and the second deployed position of the second arm cause the first and second arms to extend in the first lateral direction beyond the perimeter of the top area of the base structure, and wherein the first and second arms may be stowed to avoid extending in the first lateral direction beyond the perimeter of the top area of the base structure. Accordingly, the arms may be stowed so that the base may be transported over public roadways in compliance with width restrictions, yet easily extended to deploy solar panels at a desired location.

In some embodiments, the first trolley is moveable along the first stationary track to the first deployable track by sliding and the second trolley is moveable along the stationary track to the second deployable track by sliding. For example, the first and second trolleys may include polymeric feet or pads that are downwardly directed against the tracks to reduce friction as the trolleys are slid along the tracks.

In some embodiments, the first trolley includes wheels and is moveable along the first stationary track to the first deployable track by rolling and the second trolley includes wheels and is moveable along the stationary track to the second deployable track by rolling. In one option, the first trolley may extend along the first stationary track, secure a first wheel near a first end of the first trolley, and secure a second wheel near a second end of the first trolley. Accordingly, the first and second wheels of the first trolley may be directed to roll along the first stationary track to and from the first deployable track when the first arm is in the first deployed position. Similarly, the second trolley may extend along the second stationary track, secure a first wheel near a first end of the second trolley, and secure a second wheel near a second end of the second trolley. Accordingly, the first and second wheels of the second trolley may be directed to roll along the second stationary track to and from the second deployable track when the second arm is in the second deployed position. Any number and arrangement of wheels may be used to enable the trolleys to roll between the stationary and deployable tracks.

In some embodiments, the first end panel may form a third stationary track and the second end panel may form a fourth stationary track. The apparatus may further include a third rigid frame configured to secure a third solar panel, third and fourth trolleys, and third and fourth arms. For example, the third trolley may be supported by the third stationary track and moveable along the third stationary track, and the fourth trolley may be supported by the fourth stationary track and moveable along the fourth stationary track. Furthermore, the third rigid frame may have a first end secured to the third trolley and a second end secured to the fourth trolley. The third arm may form a third deployable track and the fourth arm may form a fourth deployable track Accordingly, the third arm may be selectively positionable in a third deployed position in which the third deployable track extends in a second lateral direction in alignment with the third stationary track, and the fourth arm may be selectively positionable in a fourth deployed position in which the fourth deployable track extends in the second lateral direction in alignment with the fourth stationary track. Positioning the third arm in the third deployed position and the fourth arm in the fourth deployed position enables the third trolley to be moved along the third stationary track to the third deployable track and the fourth trolley to be moved along the fourth stationary track to the fourth deployable track.

In some embodiments, the first and second end panels may be formed in various configurations, such as a folded metal panel or a set of interconnected posts and rails. In one example, the first and second end panels are each formed with first and second upright posts and first and second lateral rails extending between the first and second upright posts and connected to the first and second upright posts. The first lateral rail of the first end panel may form the first stationary track and the first lateral rail of the second end panel may form the second stationary track. The first lateral rail of the first end panel may form the first stationary track and the first lateral rail of the second end panel may form the second stationary track. Furthermore, the first end of the second rigid frame may be secured to the second lateral rail of the first end panel and the second end of the second rigid frame may be secured to the second lateral rail of the second end panel.

In some embodiments, each of the first and second end panels may have a third lateral rail that extends between the first and second upright posts and is connected to the first and second upright posts. Accordingly, the third lateral rail of the first end panel may form a third stationary track and the third lateral rail of the second end panel may form a fourth stationary track. The apparatus with each end panel including a third lateral rail may further include a third rigid frame configured to secure a third solar panel, third and fourth trolleys, and third and fourth arms. The third trolley may be supported by the third stationary track and moveable along the third stationary track, and the fourth trolley may be supported by the fourth stationary track and moveable along the fourth stationary track. Furthermore, the third rigid frame may have a first end secured to the third trolley and a second end secured to the fourth trolley. The third arm may form a third deployable track and the fourth arm may form a fourth deployable track, where the third arm is selectively positionable in a third deployed position in which the third deployable track extends in a second lateral direction in alignment with the third stationary track, and the fourth arm is selectively positionable in a fourth deployed position in which the fourth deployable track extends in the second lateral direction in alignment with the fourth stationary track. Positioning the third arm in the third deployed position and the fourth arm in the fourth deployed position enables the third trolley to be moved along the third stationary track to the third deployable track and the fourth trolley to be moved along the fourth stationary track to the fourth deployable track.

Figure 12A:
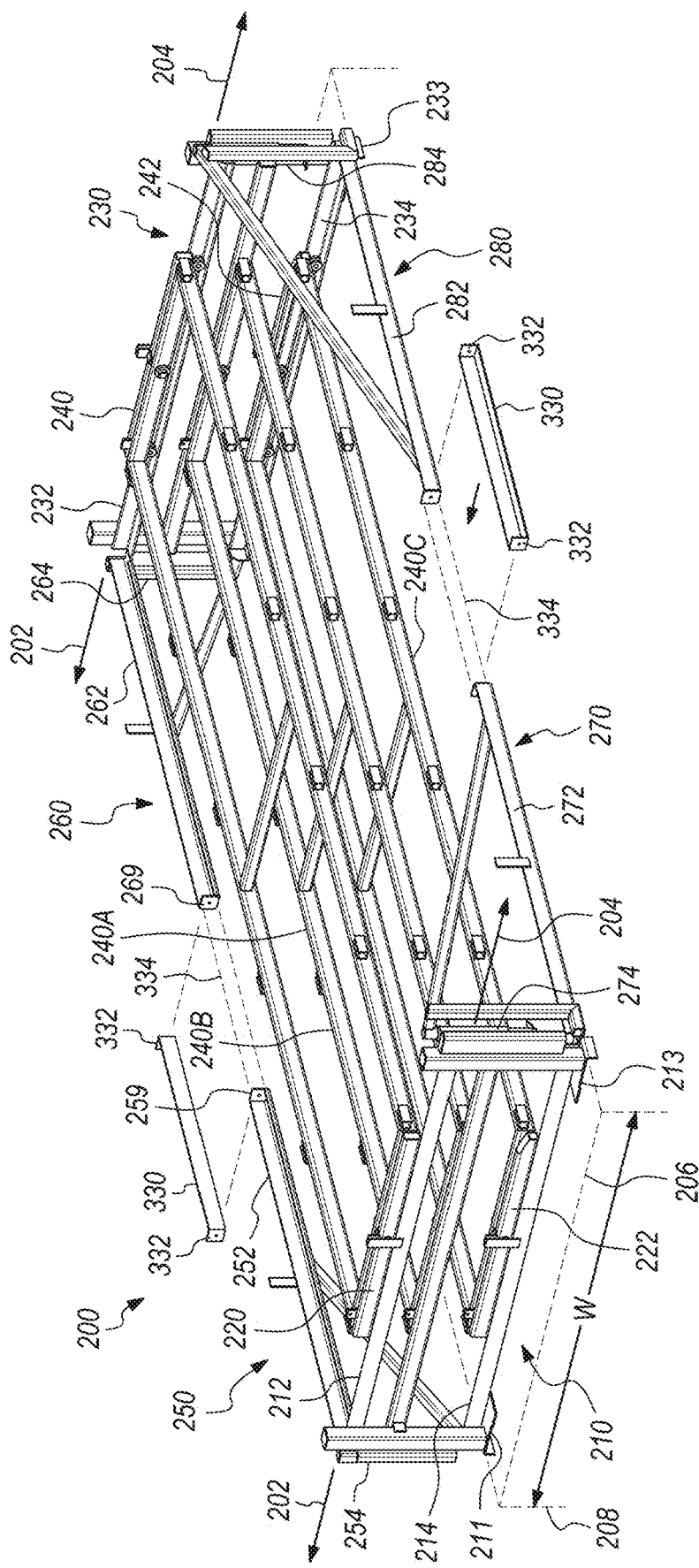
FIGS. 12A-B are perspective views of an apparatus for stowing and deploying solar panels where the rigid frames that support the solar panels and the arms that enable deployment of the solar panels are in a stowed position.

In some embodiments, the first arm may be pivotally secured to the first end panel and selectively positionable in the first deployed position by pivoting the first arm from a first stowed position, the second arm may be pivotally secured to the second end panel and selectively positionable in the second deployed position by pivoting the second arm from a second stowed position, the third arm may be pivotally secured to the first end panel and selectively positionable in the third deployed position by pivoting the third arm from a second stowed position, and the fourth arm may be pivotally secured to the second end panel and selectively positionable in the fourth deployed position by pivoting the fourth arm from a second stowed position FIG. 12A is a perspective view of an apparatus 200 for stowing and deploying solar panels (not shown) where the rigid frames 240A-C that support the solar panels and the arms 250, 260, 270, 280 that enable deployment of the solar panels are in a stowed position. The apparatus 200 includes a first end panel 210 and a second end panel 230 at an opposing end of the apparatus 200 from the first end panel 210. The first end panel 210 forms a first stationary track 212 and the second end panel 230 forms a second stationary track 232.

The apparatus 200 includes first and second rigid frames 240A-B, each rigid frame being configured to secure a solar panel (not shown). For example, the a solar panel may be secured to a rigid frame in any suitable manner and the frame may be modified to accommodate a mounting configuration that is specific to a particular solar panel. The second rigid frame 240B has a first end secured to the first end panel 210 and a second end secured to the second end panel 230.

The apparatus 200 also includes a first trolley 220 and a second trolley 240. The first trolley 220 is supported by the first stationary track 212 and moveable along the first stationary track. Similarly, the second trolley 240 is supported by the second stationary track 232 and moveable along the second stationary track, where the first rigid frame 240A has a first end secured to the first trolley 220 and a second end secured to the second trolley 240.

The apparatus 200 includes a first arm 250 and a second arm 260. The first arm 250 forms a first deployable track 252 and the second arm 260 forms a second deployable track 262. In the embodiment shown, the first arm 250 is pivotally secured to the first end panel 210 and selectively positionable in the first deployed position (see FIG. 12B) by pivoting the first arm 250 from a first stowed position shown in FIG. 12A. Similarly, the second arm 260 is pivotally secured to the second end panel 230 and selectively positionable in the second deployed position (see FIG. 12B) by pivoting the second arm 260 from a second stowed position shown in FIG. 12A. For example, the first arm 250 may pivot about substantially vertical axis formed by a first hinge 254 and the second arm 260 may pivot about substantially vertical axis formed by a second hinge 264.

In the embodiment of FIG. 12A, the first end panel 210 forms a third stationary track 214 and the second end panel 230 forms a fourth stationary track 234. Along with the third stationary track 214, the apparatus may further include the third rigid frame 240C configured to secure a third solar panel, third and fourth trolleys 222, 242, and third and fourth arms 270, 280. The third trolley 222 is supported by the third stationary track 214 and moveable along the third stationary track, the fourth trolley 242 is supported by the fourth stationary track 234 and moveable along the fourth stationary track, and the third rigid frame 240C has a first end secured to the third trolley 222 and a second end secured to the fourth trolley 242.

The third arm 270 forms a third deployable track 272 and the fourth arm 280 forms a fourth deployable track 282. In the embodiment shown, the third arm 270 is pivotally secured to the first end panel 210 and selectively positionable in the third deployed position (see FIG. 12B) by pivoting the third arm 270 from a third stowed position as shown in FIG. 12A. Similarly, the fourth arm 280 is pivotally secured to the second end panel 230 and selectively positionable in a fourth deployed position (see FIG. 12B) by pivoting the fourth arm 280 from a fourth stowed position as shown in FIG. 12A. For example, the third arm 270 may pivot about substantially vertical axis formed by a third hinge 274 and the fourth arm 260 may pivot about substantially vertical axis formed by a fourth hinge 284.

The apparatus 200 further includes mounting brackets 211, 213 connected to the first end panel 210 for securing the first end panel in a position on the top 206 of a base structure 208. Similarly, mounting brackets 231, 233 are connected to the second end panel 230 for securing the second end panel in a position on the top 206 of the base structure 208. Optionally, the base structure 208 may be a shipping container, truck box or similar mobile equipment. The mounting brackets may be greater or lesser in number and may be configured to suitably connect with a particular configuration of mobile equipment. Without limitation, the mounting brackets may be bolted or welded to the base structure 208.

The first and second end panels 210, 230 preferably extend across a major portion of the width ("W") of the base structure 208. Furthermore, the first deployed position of the first arm 250 (see FIG. 12B) and the second deployed position of the second arm 260 (see FIG. 12B) cause the first and second arms 250, 260 to extend in the first lateral direction 202 beyond the perimeter of the top 206 of the base structure 208. By contrast, the first and second arms 250, 260 may be stowed (as shown in FIG. 12A) to avoid extending in the first lateral direction 202 beyond the perimeter of the top 206 of the base structure 208. In the illustrated embodiments, the third deployed position of the third arm 270 (see FIG. 12B) and the fourth deployed position of the fourth arm 280 (see FIG. 12B) cause the third and fourth arms 270, 280 to extend in the second lateral direction 204 beyond the perimeter of the top 206 of the base structure 208. By contrast, the third and fourth arms 270, 280 may be stowed (as shown in FIG. 12A) to avoid extending in the second lateral direction 204 beyond the perimeter of the top 206 of the base structure 208.

In the embodiment shown, the first arm 250 is pivotally secured to the first end panel 210 and selectively positionable in the first deployed position (see FIG. 12B) by pivoting the first arm 250 from the first stowed position as shown, the second arm 260 is pivotally secured to the second end panel 230 and selectively positionable in the second deployed position (see FIG. 12B) by pivoting the second arm 260 from the second stowed position as shown, the third arm 270 is pivotally secured to the first end panel 210 and selectively positionable in the third deployed position (see FIG. 12B) by pivoting the third arm 270 from the third stowed position as shown, and the fourth arm 280 is pivotally secured to the second end panel 230 and selectively positionable in the fourth deployed position (see FIG. 12B) by pivoting the fourth arm 280 from the fourth stowed position as shown.

In the illustrated embodiment, the first end panel 210 has first and second upright posts 241, 243 and first and second lateral rails 215, 217 extending between the first and second upright posts 241, 243 and connected to the first and second upright posts. Furthermore, the first end panel 210 may also have a third lateral rail 219 extending between the first and second upright posts 241, 243 and connected to the first and second upright posts. Similarly, the second end panel 230 has third and fourth upright posts 245, 247 and first and second lateral rails 235, 237 extending between the first and second upright posts 245, 247 and connected to the first and second upright posts. The second end panel 230 may also have a third lateral rail 239 extending between the first and second upright posts 245, 247 and connected to the first and second upright posts.

The first lateral rail 215 of the first end panel 210 forms the first stationary track 212 and the first lateral rail 235 of the second end panel 230 forms the second stationary track 232. Similarly, the third lateral rail 219 of the first end panel 210 forms the third stationary track 214 and the third lateral rail 239 of the second end panel 230 forms the fourth stationary track 234. Furthermore, the first end of the second rigid frame 240B is secured to the second lateral rail 217 of the first end panel 210 and the second end of the second rigid frame 240B is secured to the second lateral rail 237 of the second end panel 230.

The apparatus may also include a third rigid frame 240C configured to secure a third solar panel (not shown), third and fourth trolleys 222, 242, and third and fourth arms 270, 280. The third trolley 222 is supported by the third stationary track 214 and moveable along the third stationary track, the fourth trolley 242 is supported by the fourth stationary track 234 and moveable along the fourth stationary track, and the third rigid frame 240C has a first end secured to the third trolley 222 and a second end secured to the fourth trolley 242. The third arm 270 forms a third deployable track 272 and the fourth arm 280 forms a fourth deployable track 282.

The third arm 270 is selectively positionable in a third deployed position (see FIG. 12B) in which the third deployable track 272 extends in the second lateral direction 204 in alignment with the third stationary track 214. Similarly, the fourth arm 280 is selectively positionable in a fourth deployed position (see FIG. 12B) in which the fourth deployable track 282 extends in the second lateral direction 204 in alignment with the fourth stationary track 234. Positioning the third arm 270 in the third deployed position and the fourth arm 280 in the fourth deployed position enables the third trolley 222 to be moved along the third stationary track 214 to the third deployable track 272 and the fourth trolley 242 to be moved along the fourth stationary track 234 to the fourth deployable track 282.

In the illustrated embodiments, the first and second arms 250, 260 are securable in the stowed position using a rail segment 330, such as an L-shaped channel extending between the distal ends of the two arms. In particular, the arms 250, 260 have respective stop plates 259, 269 with a hole (shown as a dot) therethrough for receiving a bolt or pin. Similarly, the rail segment 330 has opposing end plates 332 that each have a hole (shown as a dot) therethrough for receiving the bolt or pin. The rail segment 330 may be positioned between the arms 250, 260 so that the opposing end plates 332 are flush with the stop plates 259, 269 (see the position 334 indicated by dashed lines). One bolt or pin (not shown) may then be inserted and secured through the end plate 332 and stop plate 259 on the first arm 250 and a second bolt or pin (not shown) may then be inserted and secured through the opposing end plate 332 and the stop plate 269 on the second arm 260. The same type of rail segment 330 and attachment steps may be performed for the third and fourth arms 270, 280.

Figure 12B:
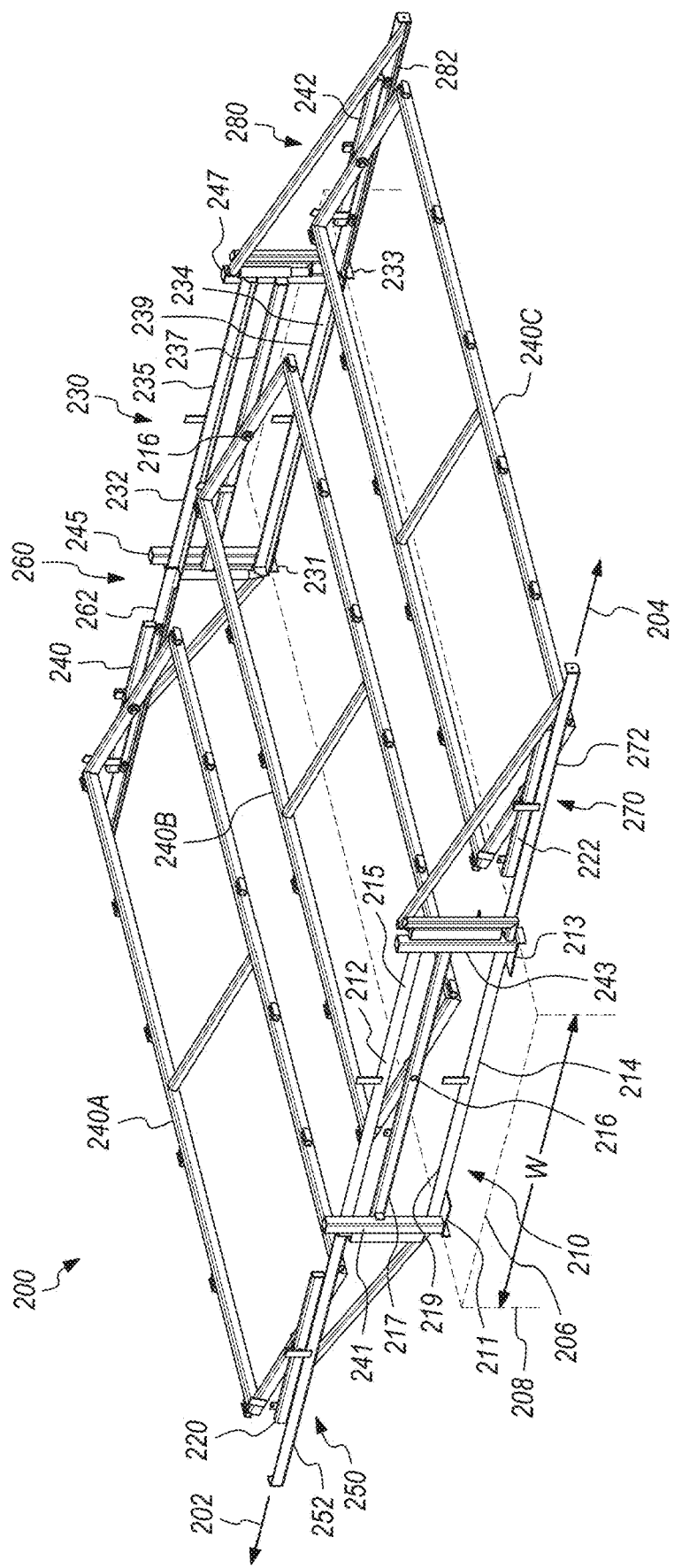

FIG. 12B is a perspective view of the apparatus 200 for stowing and deploying solar panels (not shown) where the arms 250, 260, 270, 280 are in their deployed positions and the rigid frames 240A-C that support the solar panels are also in a deployed position and angle. Specifically, the first arm 250 is in a first deployed position in which the first deployable track 252 extends in the first lateral direction 202 in alignment with the first stationary track 212, and the second arm 260 is in a second deployed position in which the second deployable track 262 extends in the first lateral direction 202 in alignment with the second stationary track 232. With the first arm 250 in the first deployed position and the second arm in the second deployed position, the first trolley 220 has been moved along the first stationary track 212 to the first deployable track 252 and the second trolley 240 has been moved along the second stationary track 232 to the second deployable track 262. The first rigid frame 240A and an attached solar panel (not shown) move with the first and second trolleys 220, 240 to the lateral position shown.

In a similar manner, the third arm 270 is in the third deployed position in which the third deployable track 272 extends in the second lateral direction 204 in alignment with the third stationary track 214, and the fourth arm 280 is in the fourth deployed position in which the fourth deployable track 282 extends in the second lateral direction 204 in alignment with the fourth stationary track 234. With the third arm 270 in the third deployed position and the fourth arm 280 in the fourth deployed position, the third trolley 222 has been moved along the third stationary track 214 to the third deployable track 272 and the fourth trolley 242 has been moved along the fourth stationary track 234 to the fourth deployable track 282. Movement of the trolleys and tilting of the rigid frames will be discussed below, such as in reference to FIGS. 14A-D, 15 and 16C.

Figure 13A:
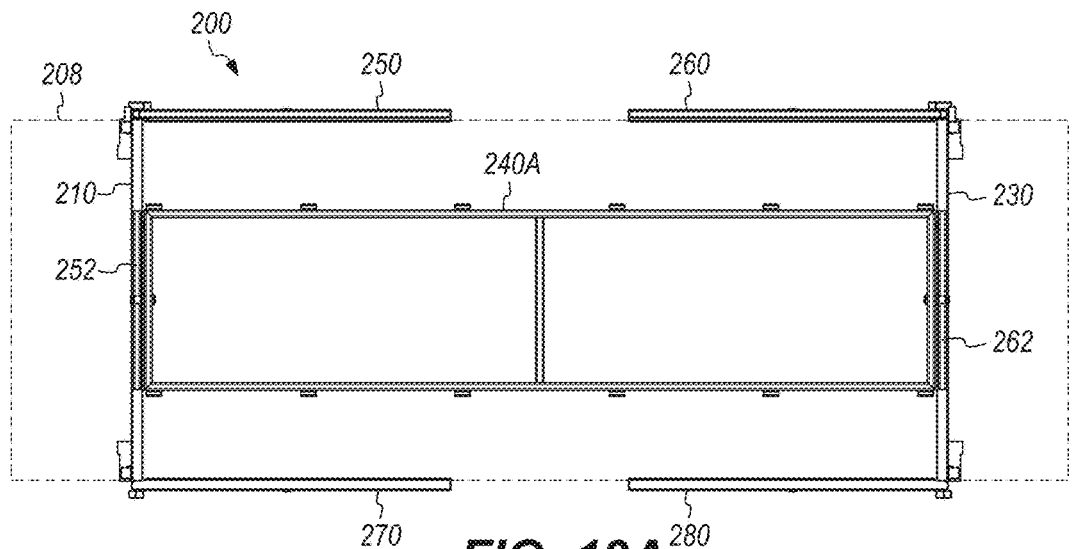
FIGS. 13A-B are top views of the apparatus in the stowed position and the deployed position, respectively.
Figure 13B:
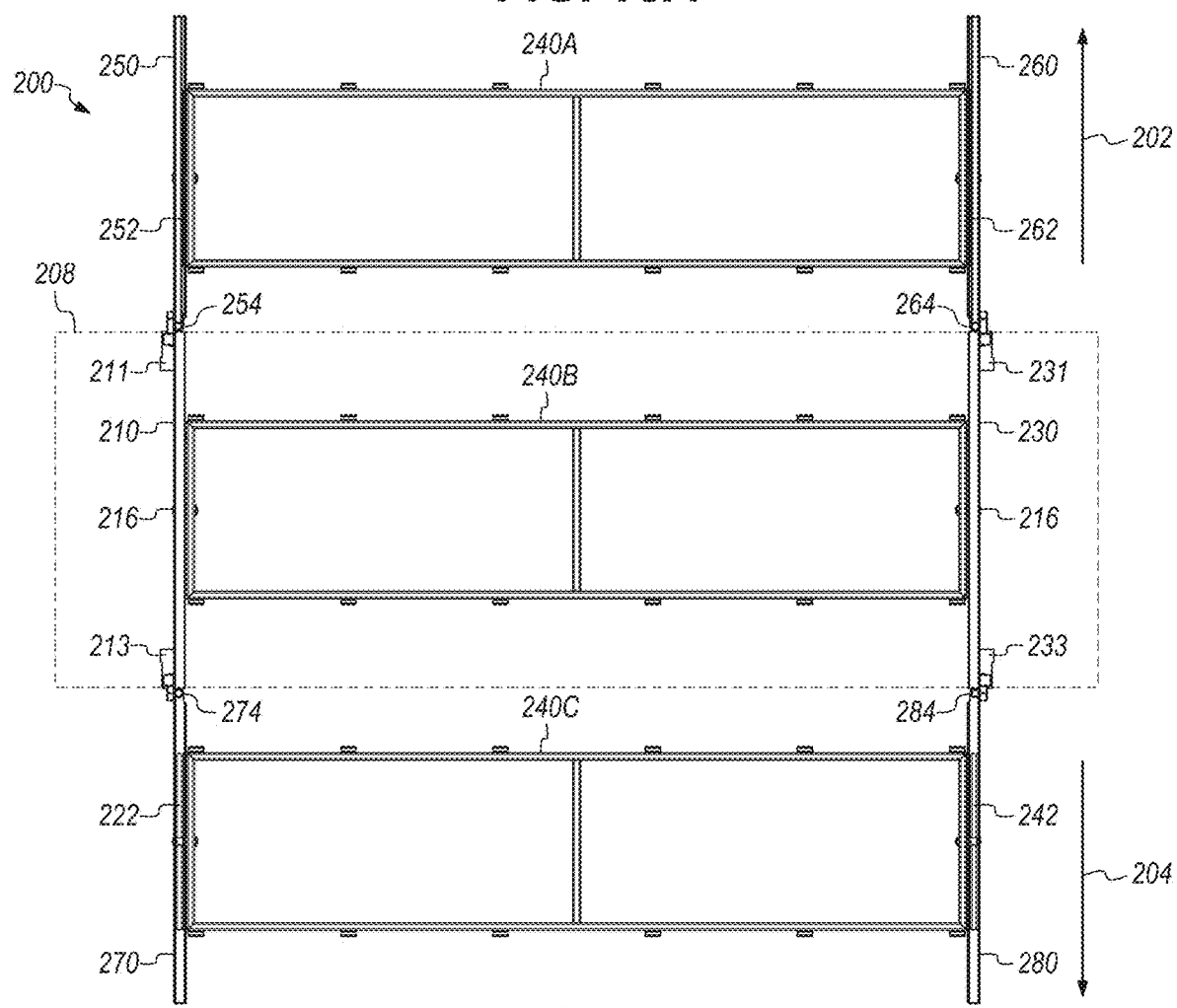

FIGS. 13A-B are top views of the apparatus 200 in the stowed position (FIG. 13A) and the deployed position (FIG. 13B), respectively. In FIG. 13A, the stowed position of the apparatus 200 keeps the arms 250, 260, 270, 280 substantially within the area of the base structure 208 or at least within a width that is permitted on public roadways or that is limited for other purposes. Accordingly, the rigid frames 240A, 240B, 240C are in a stacked configuration, with the first rigid frame 240A disposed above the other rigid frames (not shown).

In FIG. 13B, the deployed position of the apparatus 200 has the first and second arms 250, 260 extended in the first lateral direction 202 and the third and fourth arms 270, 280 extended in the second lateral direction 204 beyond the area of the base structure 208. In this embodiment, the arms 250, 260, 270, 280 have been pivoted about an axis defined by their respective hinges 254, 264, 274, 284 at approximately a right angle (about 90 degrees) relative to their stowed position in FIG. 12A. Accordingly, the first deployable track 252 aligns with the first stationary track 212, the second deployable track 262 aligns with the second stationary track 232, the third deployable track 272 aligns with the third stationary track 214, and the fourth deployable track 282 aligns with the fourth stationary track 234. It is these paired alignments of the stationary and deployable tracks that allows the trolleys to be moved laterally and carry the first and third rigid frames 240A, 240C to the deployed positions shown. In the embodiment shown, the second rigid frame 240B remains in a central position, but the first and third frames 240A, 240C are moved in opposite lateral directions such that solar panels (not shown) secured to the rigid frames may be exposed to the sun without any obstructions. The solar panels may have various shapes and sizes not limited to the shape and size of the rigid frames. However, the solar panels preferably to do not extend beyond either end of the rigid frames so that the rigid frames and solar panels may be pivoted as shown in FIG. 14D.

FIGS. 14A-D are a series of end views of the apparatus 200 illustrating stepwise changes to the configuration of the apparatus from a stowed position (see FIG. 14A corresponding to FIGS. 12A and 13A) to a deployed position (see FIG. 14D corresponding to the FIGS. 12B and 13B).

FIG. 14A is an end view of the apparatus 200 in a stowed position. The first end panel 210 has first and second upright posts 241, 243 and first, second and third lateral rails 215, 217, 219 extending between the first and second upright posts 241, 243 and connected to the first and second upright posts. The second end panel 230 (not shown) may have a symmetrical configuration. The first lateral rail 215 forms the first stationary track 212 that supports the first trolley 220 and the first end of the first rigid frame (not shown), the second lateral rail 217 supports the first end of the second rigid frame (not shown) at pivot 216, and the third lateral rail 219 forms the third stationary track 214 that supports the third trolley 222 and the third rigid frame (not shown). According, three solar panels ("SP") may be secured to an upper side of the three rigid frames as shown (in dashed lines).

The first end of the first rigid frame is pivotally secured to the first trolly 220 and the second end of the first rigid frame is pivotally secured to the second trolley (not shown). Similarly, the first end of the second rigid frame is pivotally secured to the first end panel at the pivot point 216 and the second end of the second rigid frame is pivotally secured to the second end panel (not shown). Furthermore, the first end of the third rigid frame is pivotally secured to the third trolly 222 and the second end of the third rigid frame is pivotally secured to the fourth trolley (not shown).

The apparatus 200 further includes a first trolley latch 290 for selectively securing the first trolley 220 in a fixed positioned along the first stationary track 212 and a second trolley latch 290 for selectively securing the third trolley in a fixed positioned along the third stationary track 214. The trolley latches 290 may use bolts, pins, or other fasteners to secure a trolley to the end panel 210. The apparatus 200 may further include frame latches 300 for selectively preventing a respective one of the rigid frames from pivoting relative to the end panel 210. Specifically, a first frame latch 300 may secure the first rigid frame to the first trolley 220 at a point other than the pivotal connection with the first trolley, a second frame latch 300 may secure the second rigid frame to the first end panel 210 at a point other than the pivot point 216, and a third frame latch 300 may secure the third rigid frame to the third trolley 222 at a point other than the pivotal connection with the third trolley. The frame latches 300 may use bolts, pins, or other fasteners to secure a rigid frame to its trolley or the end panel 210. The latches 290, 300 will be described further in reference to FIG. 15.

FIG. 14B is an end view of the apparatus 200, as shown in FIG. 14A, after the first arm 250 has been deployed in the first lateral direction (leftward in FIG. 14B) by pivoting the first arm about the first hinge 254 and the third arm 270 has been deployed in the second lateral direction (rightward in FIG. 14B) by pivoting the third arm about the third hinge 274. The second and third arms should also be deployed in a similar manner, but are hidden from view in FIG. 14B. Note that the solar panels ("SP") are still in the stacked configuration.

FIG. 14C is an end view of the apparatus 200, as shown in FIG. 14B, after the first (upper) trolley latch 290 has been released, the first trolley 220 has been moved along the first stationary track 212 to the first deployable track 252, and a trolley latch 290 on the first arm 250 has been latched to the first trolley 220. The second rigid frame remains in the same position as in FIG. 14B, but the first rigid frame (not shown) has moved along with the first trolley 220 such that the solar panel ("SP") secured to the second rigid frame is no longer covered by the solar panel secured to the first rigid frame. FIG. 14C also shows the apparatus 200 after the third (lower) trolley latch 290 has been released, the third trolley 222 has been moved along the third stationary track 214 to the third deployable track 272, and a trolley latch 290 on the third arm 270 has been latched to the third trolley 222. It should be understood that a similar set of trolley latches 290 may be used in reference to the second and fourth trolleys (not shown) to release the trolleys from the stacked or stowed position and then, after moving the trolleys, resecure the trolleys in a deployed position.

FIG. 14D is an end view of the apparatus 200, as shown in FIG. 14C, after a frame latch 300 for each rigid frame has been released. With the frame latches 300 released or disengaged, the first rigid frame 240A is no longer secured to the first trolley 220 except for the pivot connection, the second rigid frame 240B is no longer secured to the first end panel 210 except for the pivot connection 216, and the third rigid frame 240C is no longer secured to the third trolley 222 except for the pivot connection. Accordingly, each of the rigid frames 240A, 240B, 240C have been tilted toward the sun to increase the amount of solar energy that may be collected by the solar panels ("SP"). Notice that each of the rigid frames and solar panels are free from physical interference with any of the other rigid frames or solar panels, and that each of the solar panels is free from any structure blocking light from the sun. When the solar panel and solar structure deployment is no longer necessary or desirable, the steps illustrated in FIGS. 14A-D may be reversed to return the apparatus to the stowed position for transport, storage or to minimize damage in a severe weather event.

Figure 15:
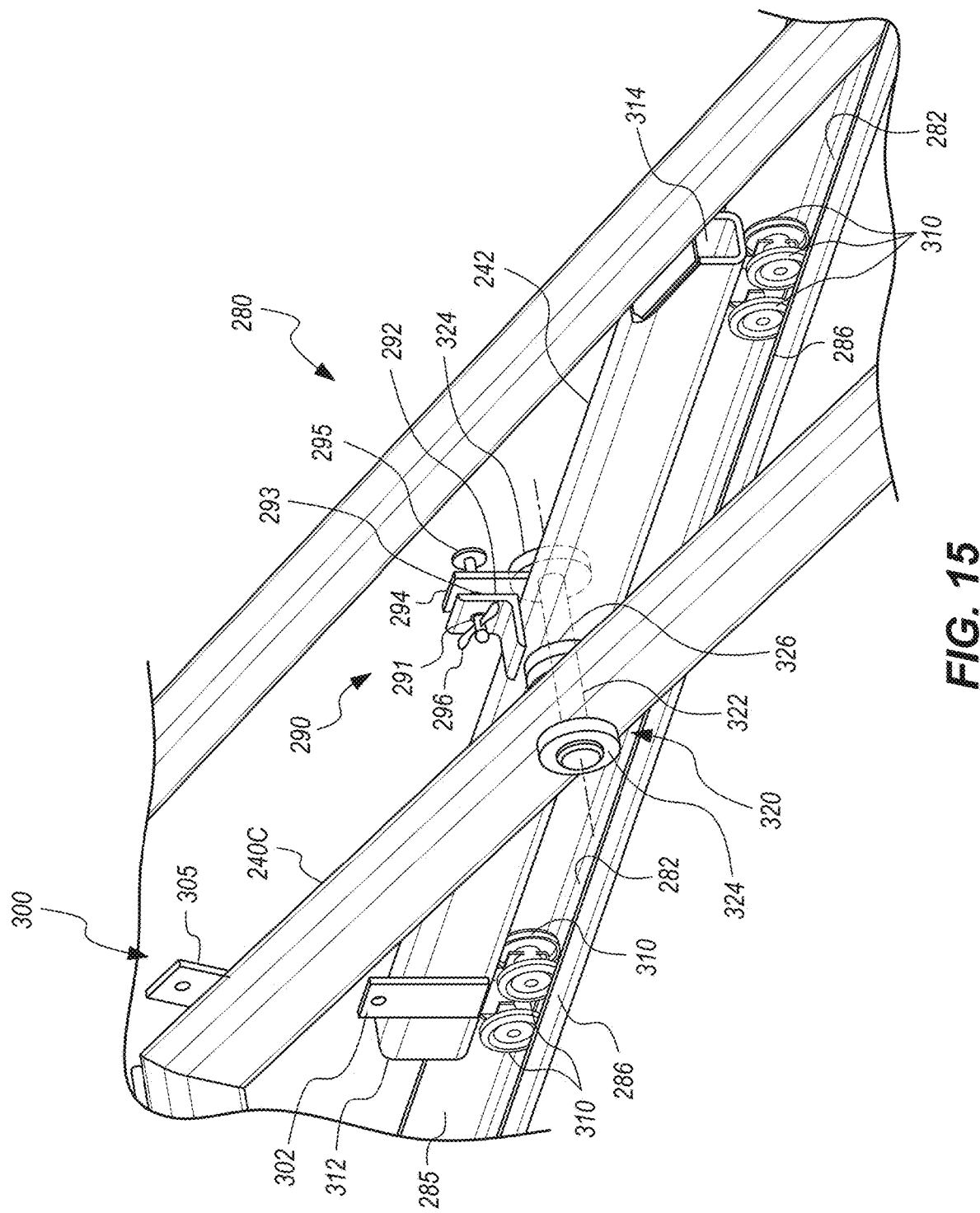
FIG. 15 is a perspective view of a trolley with wheels, where the trolley has been moved to a deployable track of an arm.

FIG. 15 is a perspective view of the fourth trolley 242 with wheels 310 secured to the lower side of the trolley for rolling within a track. Specifically, the fourth trolley 242 is moveable along the first stationary track (not shown) to the first deployable track by rolling the wheels in the tracks. As shown, the fourth trolley 242 extends along the deployable track 284 (and/or the stationary track 234; not shown; see FIG. 16B), secures a first wheel or set of wheels 310 near a first end 312 of the fourth trolley 242, and secures a second wheel or set of wheels 310 near a second end 314 of the fourth trolley. Accordingly, the first and second wheels or sets of wheels of the fourth trolley are directed to roll along the fourth stationary track 234 to the fourth deployable track 282 when the fourth arm 280 is in the fourth deployed position (see also FIG. 14B). Other trolleys may be similarly configured with wheels to move along corresponding tracks.

The fourth deployable track 282 may be formed by the fourth arm 280. In this embodiment, the fourth arm 280 includes a channel having an upstanding side rail 285 on one side of the track 282 and an upstanding rim or side rail 286 on another side of the track 282. The side rails 285, 286 of the deployable track 282 guide the wheels 310 along the deployable track. The other deployable tracks and the stationary tracks may have the same or similar channel structure with side rails to guide the wheels.

A trolley latch 290 includes an upstanding plate 292 secured to the fourth trolley 242 and an upstanding plate 294 secured to the fourth arm 280. The two upstanding plates 292, 294 are substantially parallel and each have similar holes 291, 293, respectively, that align to receive a pin 295. The pin 295 is illustrating having an optional cotter pin 296 extending through another hole in the distal end of the pin 295 to prevent the pin from accidentally pulling out the aligned holes 291, 293. With the pin 295 secured as shown, the trolly latch 290 is considered to be latched or secured such that the fourth trolley 242 is unable to move along the deployable track 282. In order to move the fourth trolley 242 back to a stowed position on the stationary track, the trolley latch must be released by removing the pin 295. It should be recognized that embodiments may include other trolley latches 290 to secure the other trolleys in a similar manner. Furthermore, a stationary track and/or deployable track may have multiple upstanding plates 294 in order to secure or fix a trolley at any one or more positions along those tracks. Embodiments preferably have a pair of upstanding plates 294 for each trolley, including a first plate 294 secured along the stationary track (to secure the trolley and rigid frame in a stowed position) and a second plate 294 secured along the deployable track that aligns with the stationary track (to secure the trolley and rigid frame in a deployed position).

The frame latches 300 may be latched and released in the same manner as the trolley latches 290 by securing a pin through aligned holes in parallel plates 302, 305. As shown, the holes in the plates 302, 305 align when the rigid frame 240C is parallel with the fourth trolley 242. However, similar frame latches 300 may be configured to secure the rigid frame 240C at any desired angle, such as by extending and relocating the plate 302 or providing a spacing plate (see FIGS. 17A-B).

A pivotable connection 320 is provided between the rigid frame 240C and the fourth trolley 242 but is representative of any pivotable connection between a rigid frame and a trolley and/or between a rigid frame and an end panel. A shaft 322 extends through the rigid frame 240C and the trolley 242 and defines a central axis about which the rigid frame 240C may pivot. The shaft 322 may have opposing heads 324 to prevent the shaft 322 from pulling through and a washer bearing 326 between the rigid frame 240C and trolley 242 to reduce friction therebetween.

Figure 16A:
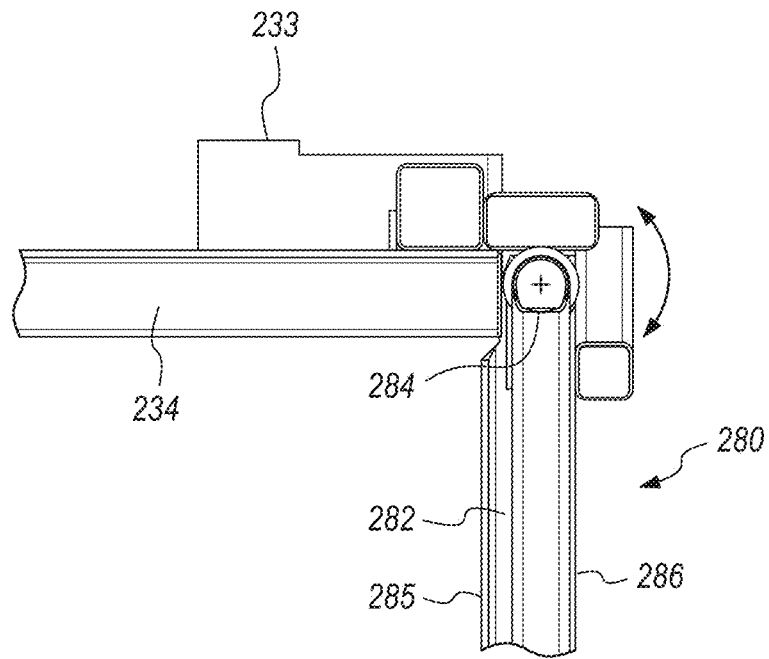
FIG. 16A-B are top views of a hinge for pivoting an arm between a stowed position and a deployed position where the stationary track aligns with the deployable track.
Figure 16B:
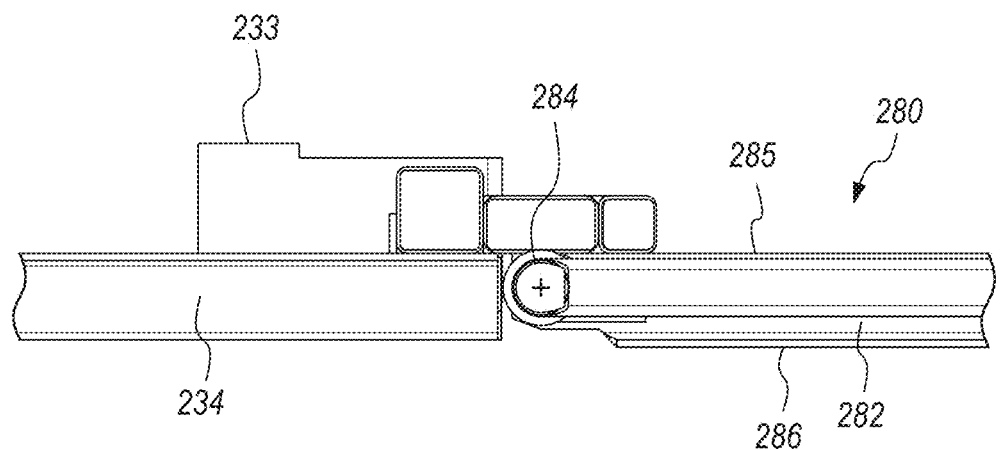

FIG. 16A-B are top views of a hinge 284 for pivoting the fourth arm 280 between a stowed position and a deployed position where the stationary track 234 aligns with the deployable track 282. The hinge 284 has a central axis that is preferably at a mid-point between the side rail 285 and side rail 28 of the stationary track 234 and the deployable track 282.

FIG. 16A is a top view of the fourth arm 280 pivoted about the axis of the hinge 284 so that the fourth arm 280 is in a stowed position. Optionally, the deployable track 282 and/or the stationary track 234 may be notched to prevent interference with the pivoting of the fourth arm 280 about the hinge 284.

FIG. 16B is a top view of the fourth arm 280 pivoted about the axis of the hinge 284 so that the fourth arm 280 is in a deployed position where the deployable track 282 is aligned with the stationary track 234.

Figure 16C:
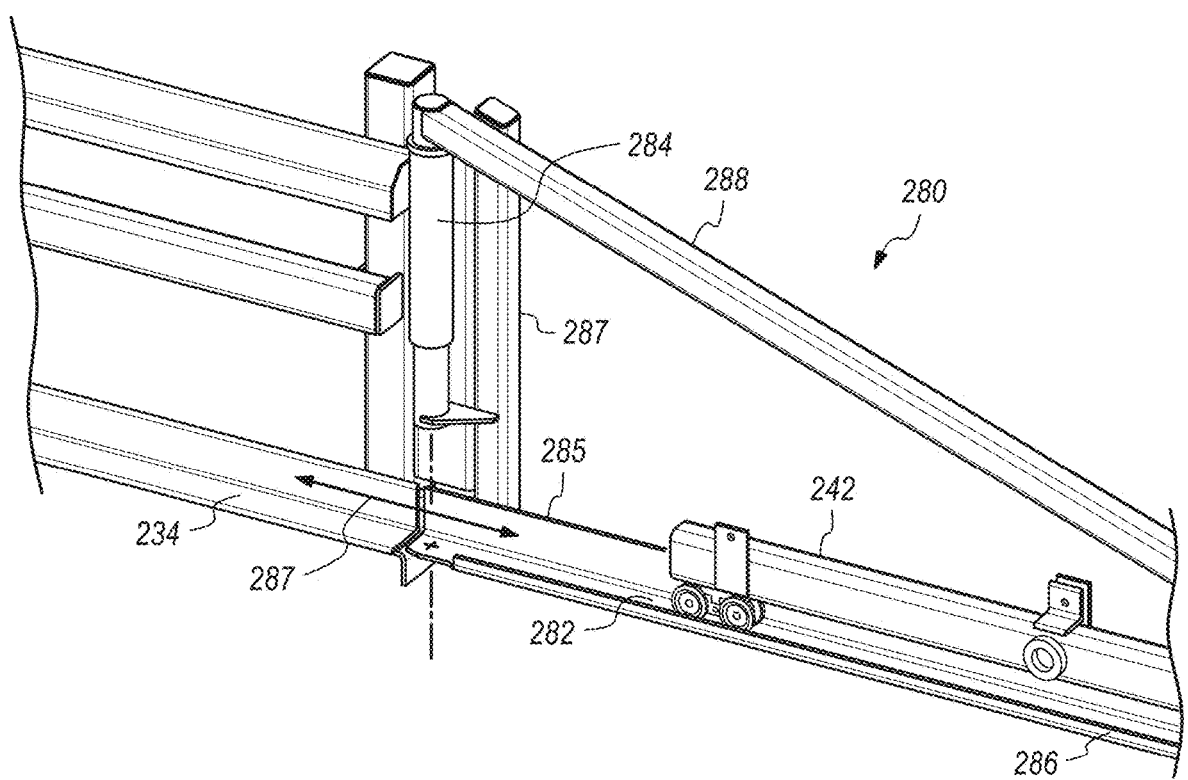
FIG. 16C is a perspective view of the hinge with the deployable track aligned with the stationary track so that the trolley may be moved between the two tracks.

FIG. 16C is a perspective view of the hinge 284 with the deployable track 282 aligned with the stationary track 234 so that the fourth trolley 242 may roll (see the bi-directional arrow 287) along and between the stationary track 234 and the deployable track 282. The fourth arm 280, as well as of the other arms, may include an upright channel or beam 287 and an angled channel or beam 288 to form a rigid triangular structure in combination with the channel or rail that forms the deployable track 282.

Figure 17A:
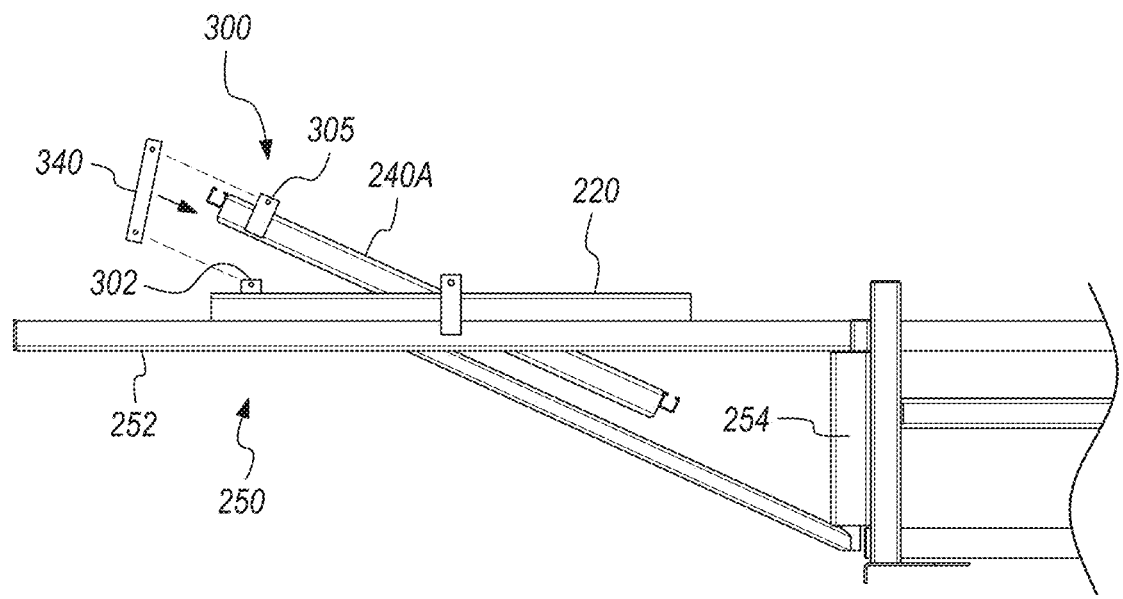
FIGS. 17A-B are side views of the first arm showing use of a spacing plate to secure the rigid frame at an angle relative to the first trolley.
Figure 17B:
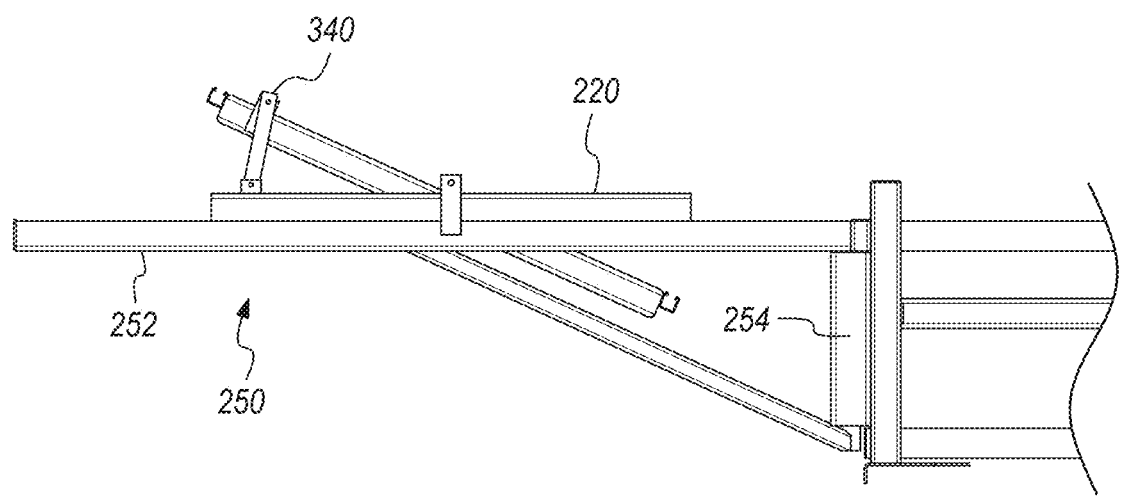

FIGS. 17A-B are side views of the first arm 250 showing use of a spacing plate 340 to secure the rigid frame 240A at an angle relative to the first trolley 220. Specifically, the distance between two holes (shown as dots) in the spacing plate 340 and the location of the parallel plates 302, 305 forming the frame latch 300 may be selected to achieve a desired angle of the rigid frame 240A and any solar panel secured to the rigid frame. Accordingly, the spacing plate 340 is positioned face-to-face with a first parallel plate 302 on the trolley 220 with a hole of the spacing plate 340 aligned with the hole in the first parallel plate 302 so that a bolt or pin may be inserted and secured through the aligned holes. The spacing plate 340 is also positioned face-to-face with a second parallel plate 305 on the rigid frame 240A with the other hole of the spacing plate 340 aligned with the hole in the second parallel plate 305 so that a bolt or pin may be inserted and secured through the aligned holes.

As will be appreciated by one skilled in the art, embodiments may take the form of a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage media (including forms referred to as volatile memory) that is not a transitory signal are, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out various operations may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Embodiments may be described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored on computer readable storage media is not a transitory signal, such that the program instructions can direct a computer, other programmable data processing apparatus, or other devices to function in a particular manner, and such that the program instructions stored in the computer readable storage medium produce an article of manufacture.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to limit the scope of the claims. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the embodiment.

The corresponding structures, materials, acts, and equivalents of all means or steps plus function elements in the claims below are intended to include any structure, material, or act for performing the function in combination with other claimed elements as specifically claimed. Embodiments have been presented for purposes of illustration and description, but it is not intended to be exhaustive or limited to the embodiments in the form disclosed. Many modifications and variations will be apparent to those of ordinary skill in the art after reading this disclosure. The disclosed embodiments were chosen and described as non-limiting examples to enable others of ordinary skill in the art to understand these embodiments and other embodiments involving modifications suited to a particular implementation.

What is claimed is:

1. An apparatus for supporting solar panels, comprising:
   first and second opposing end panels, the first end panel forming a first stationary track and the second end panel forming a second stationary track;
   first and second rigid frames, each rigid frame being configured to secure a solar panel, wherein the second rigid frame has a first end secured to the first end panel and a second end secured to the second end panel;
   first and second trolleys, wherein the first trolley is supported by the first stationary track and moveable along the first stationary track, wherein the second trolley is supported by the second stationary track and moveable along the second stationary track, and wherein the first rigid frame has a first end secured to the first trolley and a second end secured to the second trolley;

first and second arms, wherein the first arm forms a first deployable track and the second arm forms a second deployable track, wherein the first arm is selectively positionable in a first deployed position in which the first deployable track extends in a first lateral direction in alignment with the first stationary track, wherein the second arm is selectively positionable in a second deployed position in which the second deployable track extends in the first lateral direction in alignment with the second stationary track, and wherein positioning the first arm in the first deployed position and the second arm in the second deployed position enables the first trolley to be moved along the first stationary track to the first deployable track and the second trolley to be moved along the second stationary track to the second deployable track;

wherein each of the first and second end panels have first and second upright posts and first and second lateral rails extending between the first and second upright posts and connected to the first and second upright posts, wherein the first lateral rail of the first end panel forms the first stationary track and the first lateral rail of the second end panel forms the second stationary track, and wherein the first end of the second rigid frame is secured to the second lateral rail of the first end panel and the second end of the second rigid frame is secured to the second lateral rail of the second end panel;

wherein each of the first and second end panels has a third lateral rail that extends between the first and second upright posts and is connected to the first and second upright posts, and wherein the third lateral rail of the first end panel forms a third stationary track and the third lateral rail of the second end panel forms a fourth stationary track, the apparatus further comprising:

a third rigid frame configured to secure a solar panel;

third and fourth trolleys, wherein the third trolley is supported by the third stationary track and moveable along the third stationary track, wherein the fourth trolley is supported by the fourth stationary track and moveable along the fourth stationary track, and wherein the third rigid frame has a first end secured to the third trolley and a second end secured to the fourth trolley; and third and fourth arms, wherein the third arm forms a third deployable track and the fourth arm forms a fourth deployable track, wherein the third arm is selectively positionable in a third deployed position in which the third deployable track extends in a second lateral direction in alignment with the third stationary track, wherein the fourth arm is selectively positionable in a fourth deployed position in which the fourth deployable track extends in the second lateral direction in alignment with the fourth stationary track, and wherein positioning the third arm in the third deployed position and the fourth arm in the fourth deployed position enables the third trolley to be moved along the third stationary track to the third deployable track and the fourth trolley to be moved along the fourth stationary track to the fourth deployable track.

2. The apparatus of claim 1, wherein the first arm is selectively positionable in the first deployed position by attaching the first arm to the first end panel, wherein the first arm is detachable from the first end panel, wherein the second arm is selectively positionable in the second deployed position by attaching the second arm to the second end panel, and wherein the second arm is detachable from the second end panel.

3. The apparatus of claim 1, wherein the first arm is pivotally secured to the first end panel and is selectively positionable in the first deployed position by pivoting the first arm from a first stowed position, and wherein the second arm is pivotally secured to the second end panel and selectively positionable in the second deployed position by pivoting the second arm from a second stowed position.

4. The apparatus of claim 3, wherein the first and second arms pivot about a respective substantially vertical axis.

5. The apparatus of claim 1, wherein the first end of the first rigid frame is pivotally secured to the first trolley and the second end of the first rigid frame is pivotally secured to the second trolley.

6. The apparatus of claim 1, wherein the first end of the second rigid frame is pivotally secured to the first end panel and the second end of the second rigid frame is pivotally secured to the second end panel.

7. The apparatus of claim 1, wherein the first end of the first rigid frame is pivotally secured to the first trolley and the second end of the first rigid frame is pivotally secured to the second trolley, and wherein the first end of the second rigid frame is pivotally secured to the first end panel and the second end of the second rigid frame is pivotally secured to the second end panel.

8. The apparatus of claim 7, further comprising:
a first frame latch for selectively preventing the first rigid frame from pivoting relative to the first trolley; and
a second frame latch for selectively preventing the second rigid frame from pivoting relative to the first end panel.

9. The apparatus of claim 1, further comprising:
a first trolley latch for selectively securing the first trolley in a fixed positioned along the first stationary track.

10. The apparatus of claim 9, further comprising:
a second trolley latch for selectively securing the first trolley in a fixed positioned along the first deployable track of the first arm.

11. The apparatus of claim 1, further comprising:
a first mounting bracket connected to the first end panel for securing the first end panel to a top of a base structure; and
a second mounting bracket connected to the second end panel for securing the second end panel to the top of the base structure.

12. The apparatus of claim 11, wherein the base structure is a shipping container.

13. The apparatus of claim 12, wherein the first and second end panels extend across a major portion of a width of the shipping container, wherein the first deployed position of the first arm and the second deployed position of the second arm cause the first and second arms to extend in the first lateral direction beyond a perimeter of the top of the shipping container, and wherein the first and second arms may be stowed to avoid extending in the first lateral direction beyond the perimeter of the top of the shipping container.

14. The apparatus of claim 1, wherein the first trolley is moveable along the first stationary track to the first deployable track by sliding and the second trolley is moveable along the stationary track to the second deployable track by sliding.

15. The apparatus of claim 1, wherein the first trolley includes wheels and is moveable along the first stationary track to the first deployable track by rolling, and wherein the second trolley includes wheels and is moveable along the stationary track to the second deployable track by rolling.

16. The apparatus of claim 1, wherein the first trolley extends along the first stationary track, secures a first wheel near a first end of the first trolley, and secures a second wheel near a second end of the first trolley, and wherein the first and second wheels of the first trolley are directed to roll along the first stationary track to the first deployable track when the first arm is in the first deployed position; and wherein the second trolley extends along the second stationary track, secures a first wheel near a first end of the second trolley, and secures a second wheel near a second end of the second trolley, and wherein the first and second wheels of the second trolley are directed to roll along the second stationary track to the second deployable track when the second arm is in the second deployed position.

17. The apparatus of claim 1, wherein the first arm is pivotally secured to the first end panel and selectively positionable in the first deployed position by pivoting the first arm from a first stowed position, the second arm is pivotally secured to the second end panel and selectively positionable in the second deployed position by pivoting the second arm from a second stowed position, the third arm is pivotally secured to the first end panel and selectively positionable in the third deployed position by pivoting the third arm from a third stowed position, and the fourth arm is pivotally secured to the second end panel and selectively positionable in the fourth deployed position by pivoting the fourth arm from a fourth stowed position.

* * * * *